(12) United States Patent
Volin

(10) Patent No.: US 10,153,656 B2
(45) Date of Patent: Dec. 11, 2018

(54) UNIQUE FIVE-DEVICE-IN-ONE SOLAR-POWERED FOLDABLE TILTABLE DEVICE-RECHARGING WORKSTATION SYSTEM, COMPRISING SOLAR-ELECTRICITY SYSTEM, EXTENDABLE-RETRACTABLE-CABLE SYSTEM, FOLDABLE TILTABLE RECHARGING WORKSTATION SYSTEM, FOLDABLE TILTABLE SUN-VISOR SYSTEM, AND TRANSPARENT POUCH SYSTEM

(71) Applicant: Dee Volin, Fairview, OR (US)

(72) Inventor: Dee Volin, Fairview, OR (US)

( * ) Notice: Subject to any disclaimer, the term of this patent is extended or adjusted under 35 U.S.C. 154(b) by 47 days.

(21) Appl. No.: 15/481,905

(22) Filed: Apr. 7, 2017

(65) Prior Publication Data

US 2017/0294802 A1    Oct. 12, 2017

Related U.S. Application Data

(60) Provisional application No. 62/320,061, filed on Apr. 8, 2016.

(51) Int. Cl.
| | |
|---|---|
| *H02J 7/35* | (2006.01) |
| *H02J 7/00* | (2006.01) |
| *A45B 3/00* | (2006.01) |
| *A45B 1/00* | (2006.01) |
| *A45B 23/00* | (2006.01) |

(Continued)

(52) U.S. Cl.
CPC .................. *H02J 7/35* (2013.01); *A45B 1/00* (2013.01); *A45B 3/00* (2013.01); *A45B 23/00* (2013.01); *A47B 5/02* (2013.01); *A47B 5/04* (2013.01); *A47B 37/04* (2013.01); *F16L 3/012* (2013.01); *H02J 7/0044* (2013.01); *A45B 2023/0093* (2013.01); *A45B 2200/1027* (2013.01);

(Continued)

(58) Field of Classification Search
CPC ............ H02J 7/35; H02J 3/383; H01L 31/042
USPC .......................................... 320/101; 136/244
See application file for complete search history.

(56) References Cited

U.S. PATENT DOCUMENTS

| | | |
|---|---|---|
| 1,958,626 A | 5/1934 | Krantz |
| 4,193,389 A | 3/1980 | Ku |

(Continued)

*Primary Examiner* — M Baye Diao

(57) ABSTRACT

A five-device-in-one solar-charging sun-visor foldable tiltable workstation comprises: an umbrella post, solar panels attached to the umbrella post, an electricity converter connected to the solar panels, a battery connected to the electricity converter for charging mobile devices, an electrical wire connected to the battery, a retractable extendable cable connected to the electrical wire, a spool rotationally connected to the retractable extendable cable, UBS connectors connected to the retractable extendable cable, an adjustable clamp attached to the umbrella post, having memory-stick and sunglass holders, a rotatable foldable tiltable table attached to the adjustable clamp, a foldable tiltable cup-holding system molded in the table for holding drinks in multiple angles, a waterproof transparent hooded pouch attached to the table for holding mobile devices in multiple angles while a user stands, sits, or swim in front of, or lays down under the pouch, and foldable tiltable sun-visors foldably hinged on the table for blocking the sun in multiple angles while a user stands, sits, or swim in front of, or lays down under the pouch.

20 Claims, 22 Drawing Sheets

(51) Int. Cl.
    *A47B 37/04*     (2006.01)
    *A47B 5/04*     (2006.01)
    *F16L 3/01*     (2006.01)
    *A47B 5/02*     (2006.01)
    *A47B 13/16*     (2006.01)
    *A47B 23/00*     (2006.01)

(52) U.S. Cl.
    CPC ....... *A45B 2200/1063* (2013.01); *A47B 13/16* (2013.01); *A47B 2023/008* (2013.01)

(56) References Cited

U.S. PATENT DOCUMENTS

| | | |
|---|---|---|
| 4,527,721 A | 7/1985 | Goldstein |
| 5,630,566 A | 5/1997 | Case |
| 6,059,213 A | 5/2000 | Phillips |
| 6,578,683 B1 | 6/2003 | Burke |
| 6,772,699 B1 * | 8/2004 | Elliott .................. A47B 87/002 108/115 |
| 7,047,902 B1 * | 5/2006 | Little ...................... B63B 17/02 114/292 |
| 7,614,600 B1 | 11/2009 | Smith |
| 7,938,372 B2 | 5/2011 | MacLeod |
| 7,984,886 B2 | 7/2011 | Lin |
| 8,360,079 B2 | 1/2013 | Li |
| 8,497,656 B2 | 7/2013 | Portis, Jr. |
| 8,695,614 B2 | 4/2014 | Chaimovski |
| D703,939 S | 5/2014 | Akin |
| 8,964,406 B2 * | 2/2015 | Wacker ................... H01M 2/30 361/810 |
| 9,066,584 B2 * | 6/2015 | Li ............................ A47C 7/66 |
| 9,088,181 B2 | 7/2015 | Akin |
| 9,125,462 B2 | 9/2015 | Akin |
| D779,810 S | 2/2017 | Akin |
| 2006/0107979 A1 * | 5/2006 | Kim ........................ A45B 5/00 135/16 |
| 2012/0017954 A1 | 1/2012 | Li |
| 2014/0009103 A1 | 1/2014 | Nita |
| 2015/0320162 A1 | 11/2015 | Akin |
| 2017/0055653 A1 | 3/2017 | Pan |

\* cited by examiner

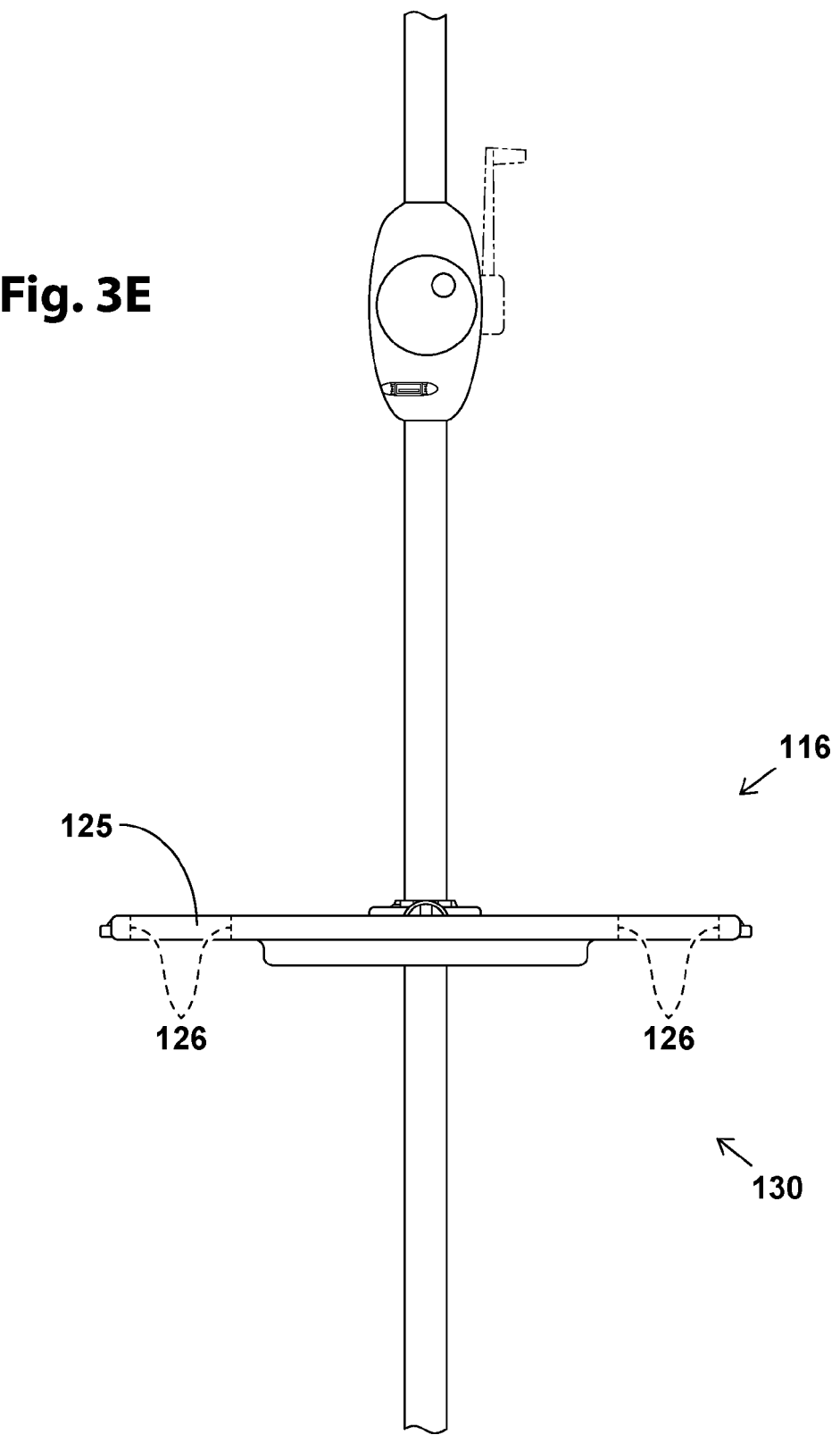

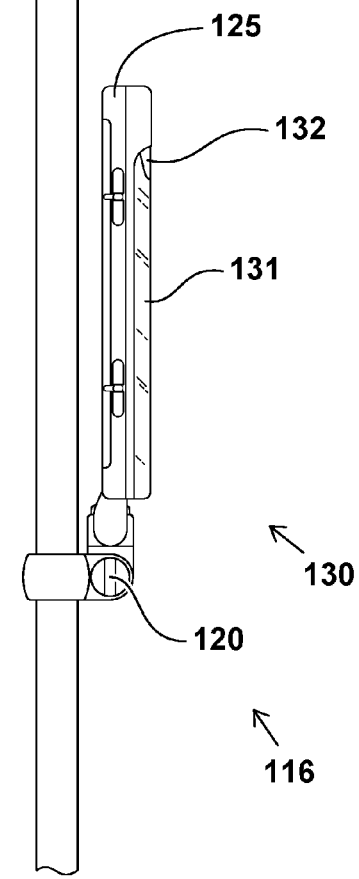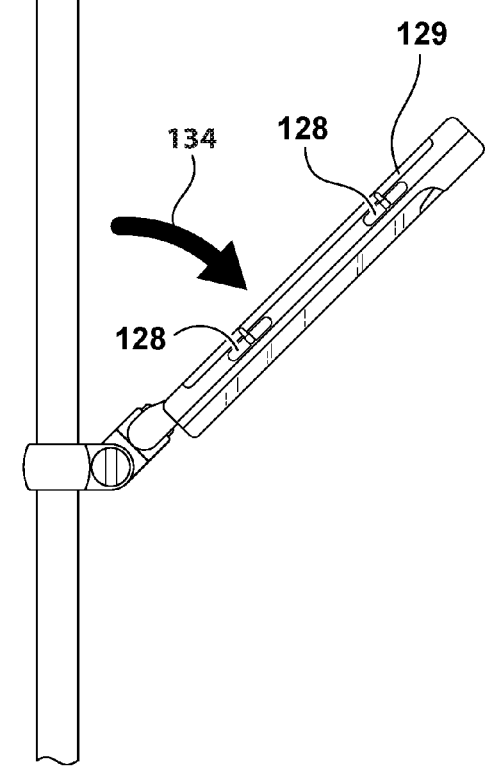
Fig. 3F
Fig. 3G

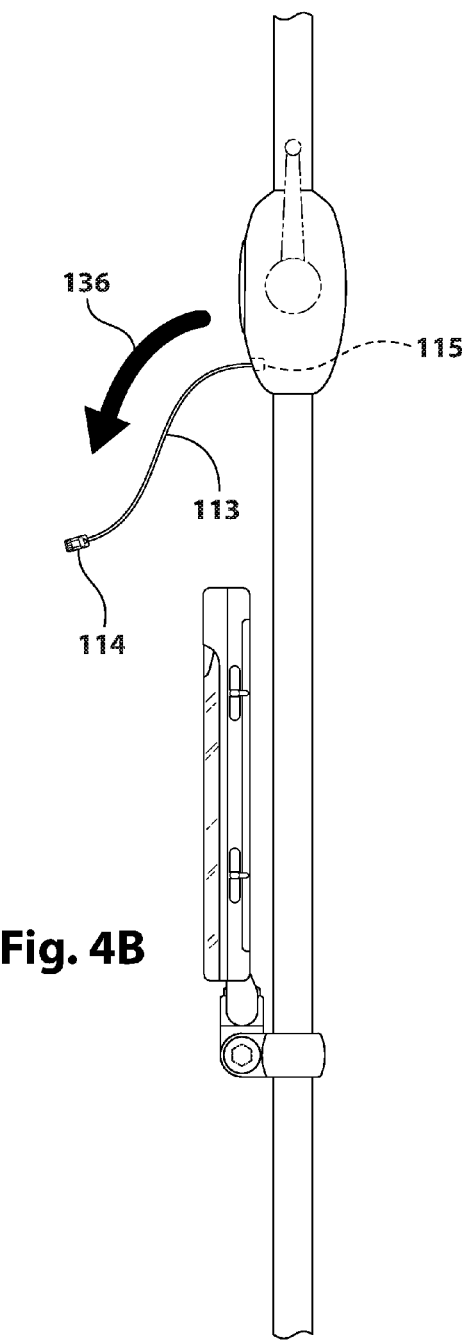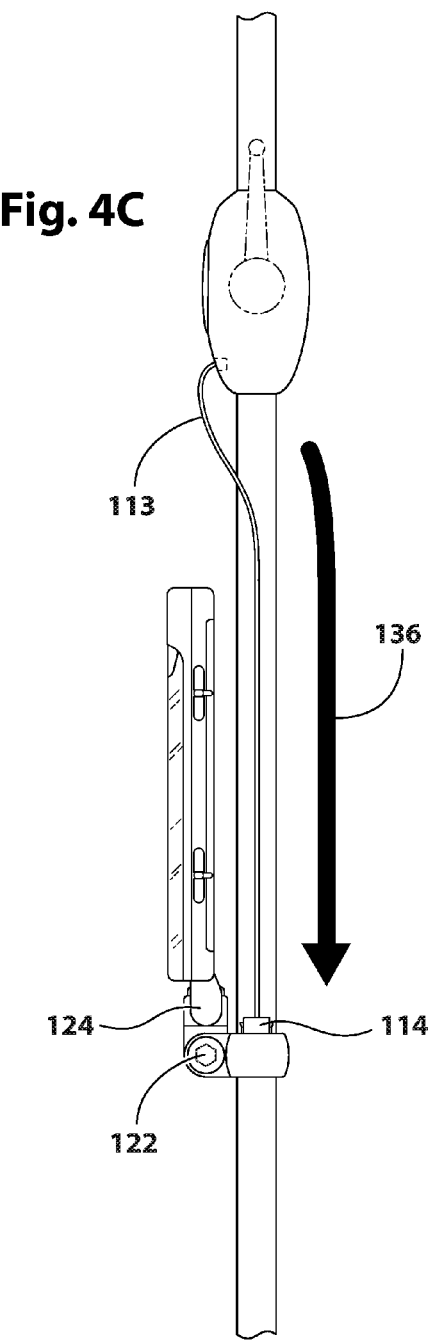

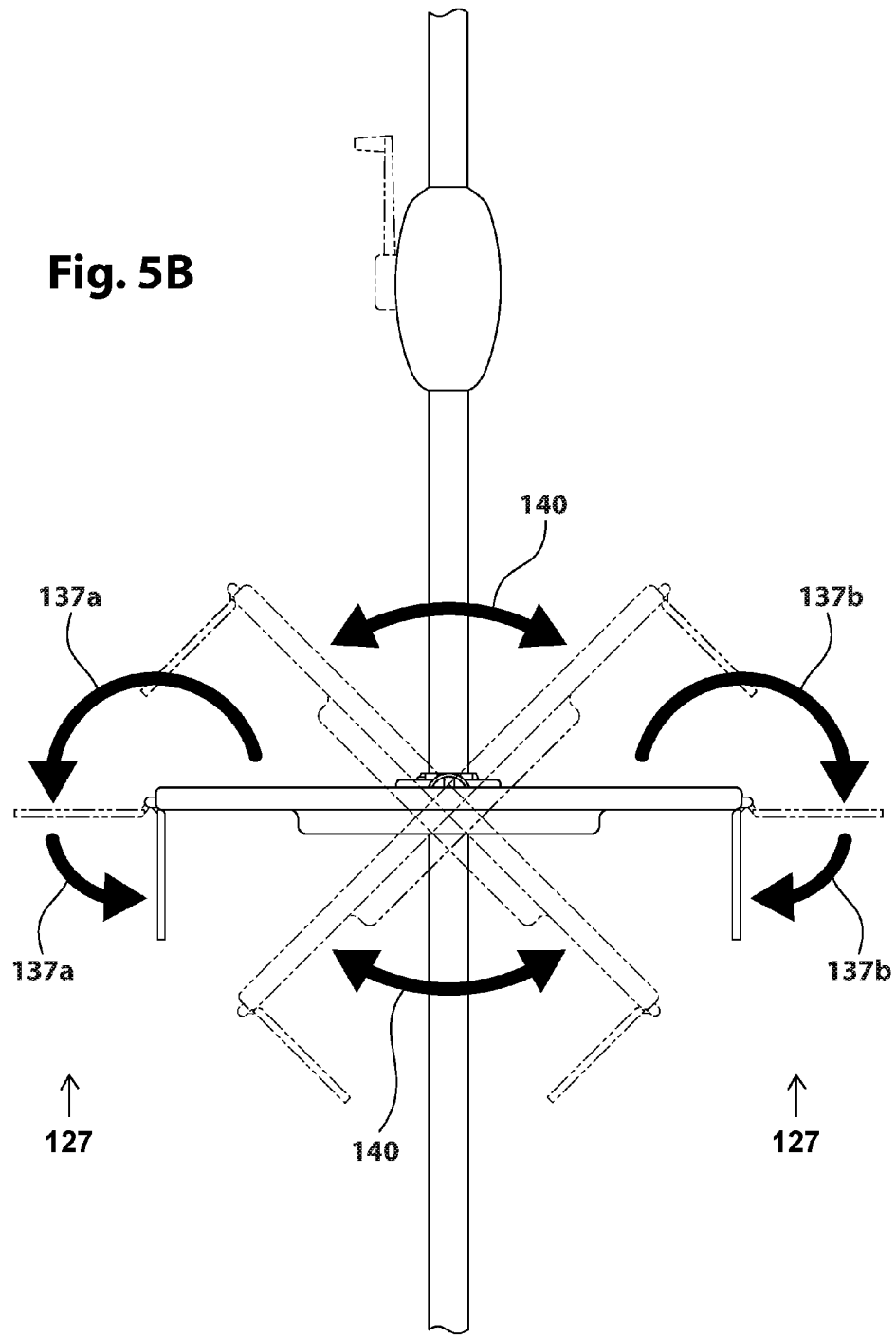

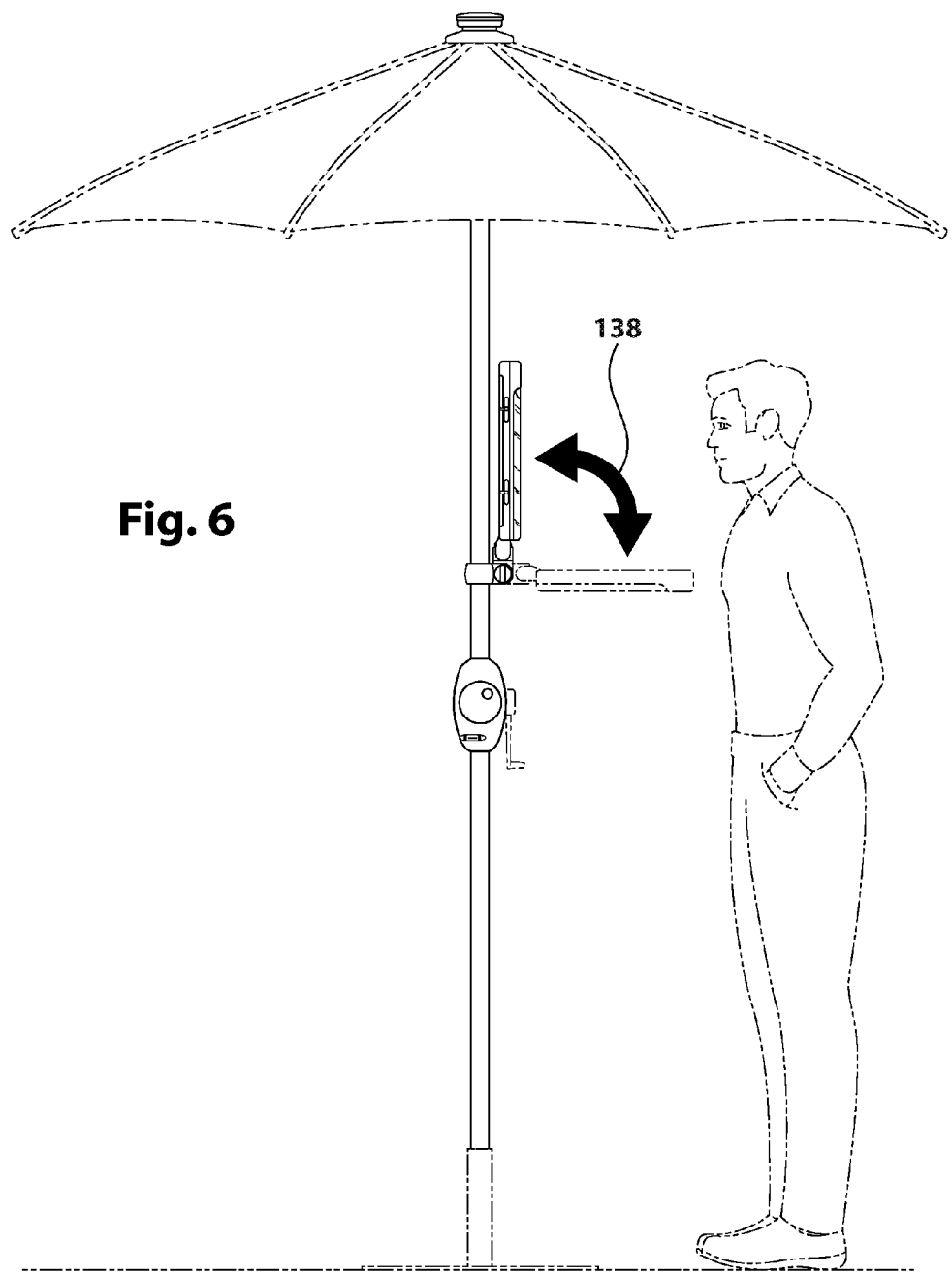

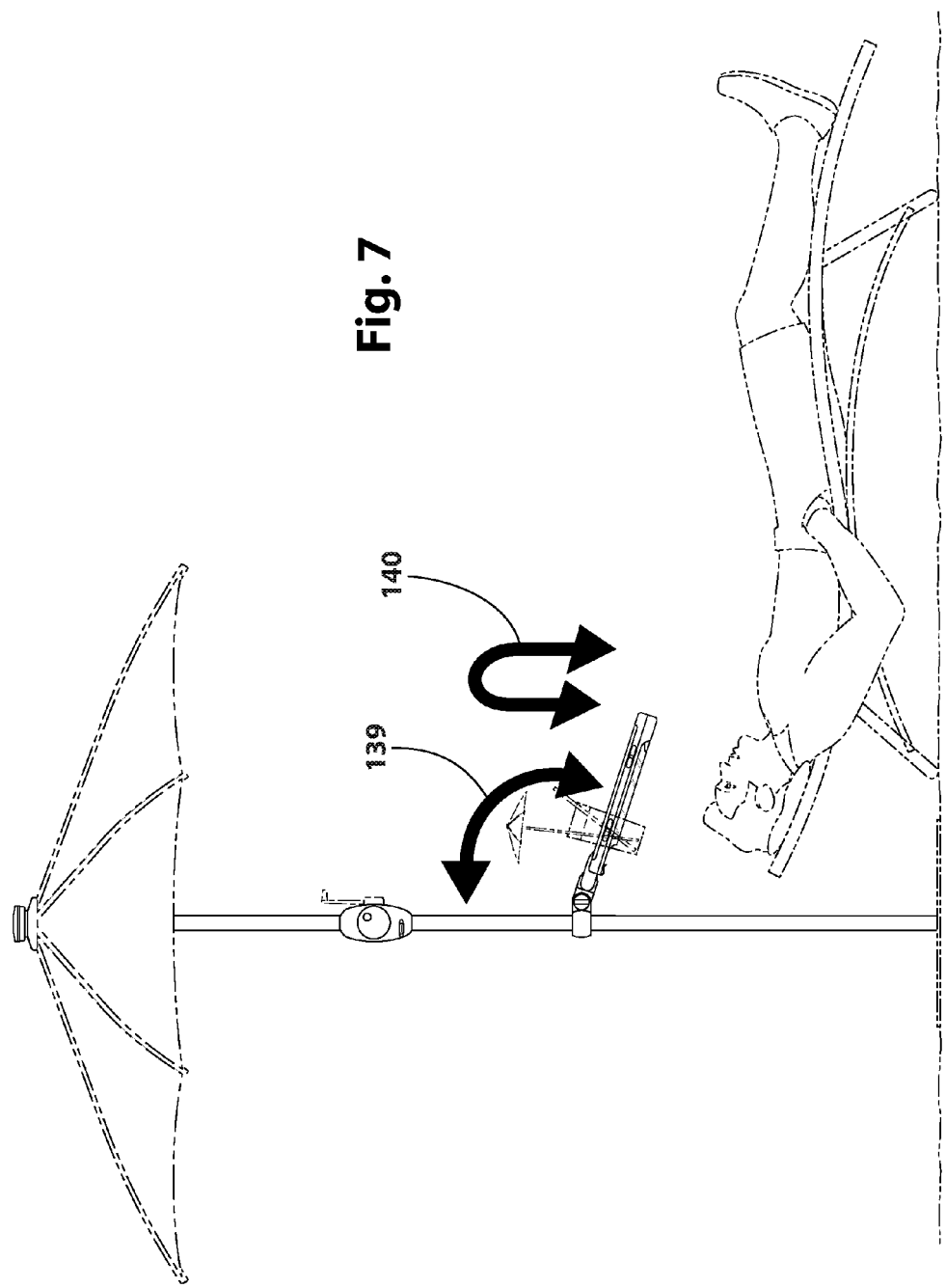

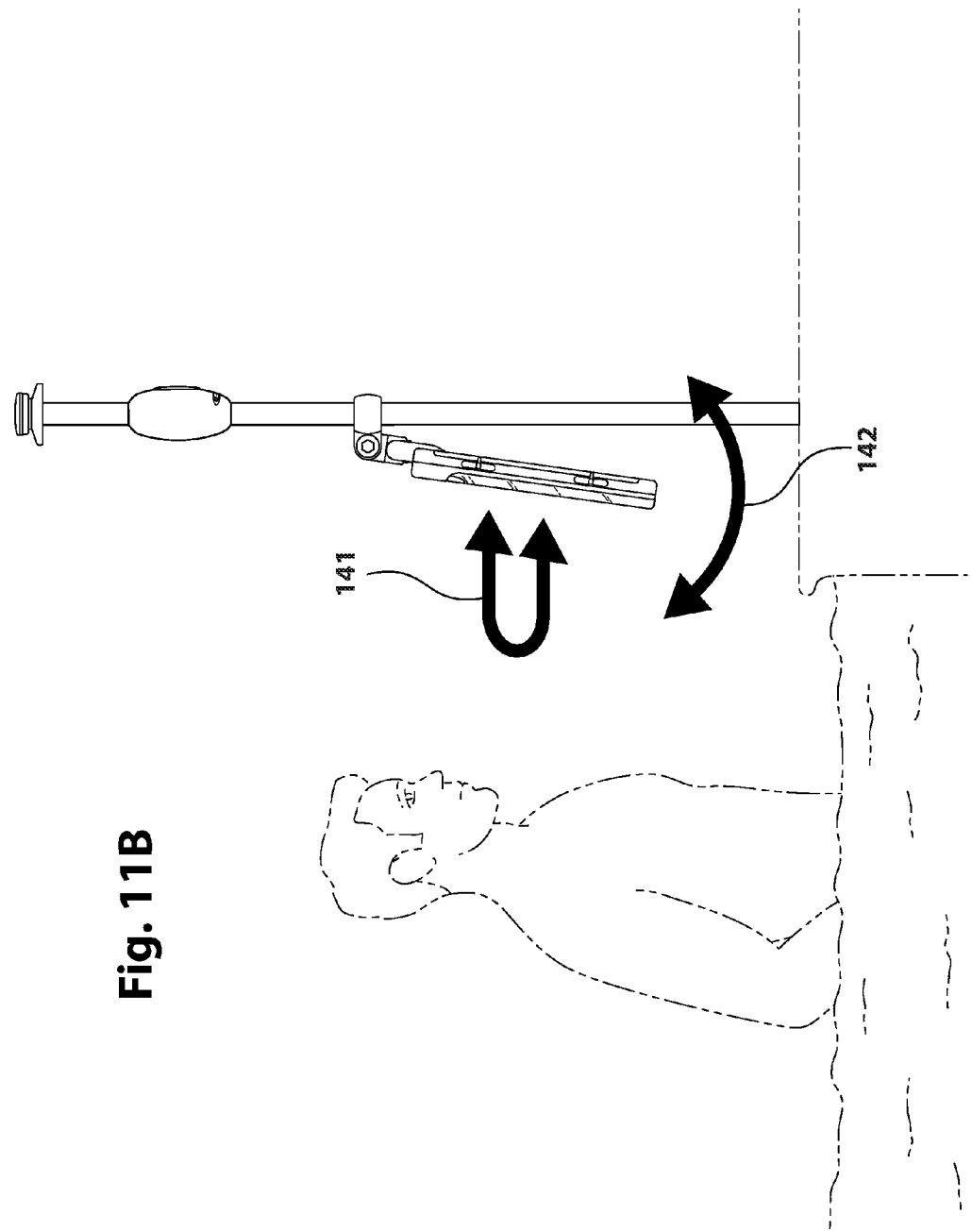

UNIQUE FIVE-DEVICE-IN-ONE SOLAR-POWERED FOLDABLE TILTABLE DEVICE-RECHARGING WORKSTATION SYSTEM, COMPRISING SOLAR-ELECTRICITY SYSTEM, EXTENDABLE-RETRACTABLE-CABLE SYSTEM, FOLDABLE TILTABLE RECHARGING WORKSTATION SYSTEM, FOLDABLE TILTABLE SUN-VISOR SYSTEM, AND TRANSPARENT POUCH SYSTEM

REFERENCE TO PREVIOUSLY FILED PROVISIONAL PATENT APPLICATION

Provisional Patent Application No. 62/320,061 was filed on Apr. 8, 2016.

FIELD OF THE INVENTION

The present invention relates to a solar-powered-charging-station umbrella, which is cheap to produce, is easy to ship as one unit, can quickly and easily be assembled and disassembled, and can quickly and easily be folded and unfolded. Particularly, the present invention relates to a five-device-in-one solar-powered foldable tiltable device-recharging sun-blocking-visor workstation system, having:
a) Solar-powered electricity-generating-and-storing system, with extendable-retractable-cable system,
b) Foldable tiltable device-recharging workstation system,
c) Foldable tiltable sun-visor system,
d) Foldable tiltable cup-holding system, and
e) Foldable tiltable transparent pouch system.

DESCRIPTION OF THE PRIOR ART

A number of solar-powered charging station have been introduced.

U.S. Pat. No. 1,958,626, issued 1934 May 15, to Hubert K. Krantz, relates to a reeling device and more particularly to reels for cords attached to electrical apparatus.

U.S. Pat. No. 4,193,389, issued 1980 Mar. 18, to Paul H. Ku, relates to an umbrella has a reflective concave face serving a radiant energy collector when the umbrella is invertedly mounted, and a clamp clamps onto the umbrellas shaft a vessel containing water partially filling the same, the vessel being of narrow thickness and being supported at a point of converging reflected rays of energy, the vessel having upper steam space connected to a heating-vessel for heating typically a cup of coffee by heat-exchange with the coffee cup, and having a drain conduit for draining condensed steam back to the liquid-containing vessel, a steam conduit channeling steam through a liquid trap for removing water droplets carried by the steam, and the umbrella when upright serving as typically a beach umbrella which shifts with the wind by virtue of the shaft being off-set from the center.

U.S. Pat. No. 4,527,721, issued 1985 Jul. 9, to Richard M. Goldstein, concerns a carrying sled capable of conversion into a beach umbrella. The carrying sled includes a rigid dish-shaped member with wheels or rails on the dish convex surface. An annular flexible material is secured to and along the outer edge of the dish and includes a draw string positioned around and secured in the outer edge of the flexible material for drawing up the flexible material when desired. Pockets are formed at the outer edges of the flexible material for receiving a spoke disposable therein and passing through a tunnel member on the convex side of the dish for maintaining the flexible material in an outwardly extending position from the edge of the dish.

U.S. Pat. No. 5,630,566, issued 1997 May 20, to Laura Case, describes a portable ergonomic computer workstation is disclosed which will permit a disabled individual to operate a computer in a convenient and comfortable fashion from a bed, wheelchair, any chair or standing. The workstation is potable and includes a variety of adjustable support elements which may hold and support computer components including the keyboard, screen, mouse and pad, as well as the computer itself.

U.S. Pat. No. 5,630,566, issued 1997 May 20, to Laura Case, describes a portable ergonomic computer workstation is disclosed which will permit a disabled individual to operate a computer in a convenient and comfortable fashion from a bed, wheelchair, any chair or standing. The workstation is potable and includes a variety of adjustable support elements which may hold and support computer components including the keyboard, screen, mouse and pad, as well as the computer itself.

U.S. Pat. No. 6,059,213, issued 2000 May 9, to John Q. Phillips, pertains to a reeling device which allows an electrical lead to be wound up without the need for slip-rings. The lead is partially wound around a spool and is electrically connected to contacts in a spindle, about which the spool rotates. A portion of the lead is sprung and is loaded as the spool rotates to pay out the lead. A ratchet and pawl mechanism is provided to lock the lead in its extended configuration.

U.S. Pat. No. 6,578,683, issued 2003 Jun. 17, to Paul Burke, outlines a cord reel device (1) for connecting a signal source (A) to a remote device (B, C) comprises a spool (2) rotatable on an arbor (18), the spool (2) having an inner chamber (6) and an outer trough (8). A retractable cord (10) is removably held in the trough (8). A spring (220) for urging the rotation of the spool (2) in a direction to retract the cord (10) is held in the inner chamber (6). The inner cable (24) is electrically connected to the retractable cord (10).

U.S. Pat. No. 7,614,600, issued 2009 Nov. 10, to James C. Smith, refers to an umbrella base is comprised of a body portion containing a power source for powering umbrella lights or electrical devices or appliances used around the umbrella or other furniture accessory held by the base. A power console is provided for use on or above the base to provide connectivity to the power supply.

U.S. Pat. No. 7,938,372, issued 2011 May 10, to Edward N. MacLeod, describes an apparent need exists for compact devices to ergonomically support such items as laptop computers, keyboards and projectors. The AIRDESK® desk/stand design positions such items with full 3D positioning using all 6 directions of adjustment. Each direction of motion has the correct friction and range of motion for easy and secure re-positioning. Unique accessory shelves and cup holder may be attached to the device frame.

U.S. Pat. No. 7,984,886, issued 2011 Jul. 26, to Rocky Yi-Ping Lin, defines a carrying apparatus of an automobile portable electronic device includes a carrying module, a support rod, a quick release mechanism and a universal joint. The carrying module includes a tray, and the support rod is installed under the tray. The quick release mechanism is installed between the tray and the support rod.

U.S. Pat. No. 8,360,079, issued 2013 Jan. 29, to Wanda Ying Li, concerns a solar lighting arrangement, which is incorporated with an outdoors umbrella, includes a solar energy collector mounted on top of the outdoors umbrella, a chain lighting arrangement, an attachable lighting system, and a light support, which is adjustably mounted along a supporting shaft of the outdoors umbrella at a position within the shadowing area of the awning frame, including a plurality of supporting arms radially extended from the supporting shaft.

U.S. Pat. No. 8,497,656, issued 2013 Jul. 30, to Matthew N. Portis Jr., outlines a solar umbrella and table apparatus with attached chairs features stand-alone AC power, generated from solar energy. The apparatus features an umbrella having solar collection devices and a table with attached seating chairs. The electrical system of the apparatus converts collected solar energy to an electrical voltage. Batteries store the energy provided by the solar panels.

U.S. Pat. No. 8,695,614, issued 2014 Apr. 15, to Dan Chaimovski, reveals an air cooled sunshade constructed to provide cooling under the canopy of the sunshade. The foldable canopy of the sunshade includes a plurality of segments of elongated panels having embedded solar panels and a plurality of segments of pliable material to allow the canopy to easily stretch when in the open position and collapse in the closed position, typically arranged having one elongated panel connected on foldable material segment arranged around a center piece.

U.S. Pat. No. 9,088,181, issued 2015 Jul. 21, to Sarah Akin, demonstrates a device for providing electrical power from light for charging a portable electronic device includes a frame structure, a shade attached to the frame structure, and a solar panel attached to the frame structure and positioned above the shade. The device includes a rechargeable battery configured to be recharged by the solar panel, and a charging terminal configured to connect to the portable electronic device and supply charge from the rechargeable battery to the portable electronic device.

U.S. Pat. No. 9,125,462, issued 2015 Sep. 8, to Sarah Akin, describes a solar charging umbrella uses solar power to charge electronic devices. The umbrella is self-sustained, capable of charging electronic devices in locations away from electrical outlets. The umbrella has a rechargeable battery that is recharged by sunlight. When charged, the umbrella's battery can charge devices when sunlight is not available. The umbrella supports simultaneous charging of high power devices such as tablet computers.

U.S. Pat. No. D703,939, issued 2014 May 6, to Sarah Akin, depicts the ornamental design for an umbrella with solar panels, as shown and described.

U.S. Pat. No. D779,810, issued 2017 Feb. 28, to Sarah Akin, depicts the ornamental design for an umbrella with solar panels, as shown and described.

U.S. Patent No 20120017954, issued 2012 Jan. 26, to Wanda Ying Li, details a controller unit for electrically controlling an outdoor shading device having an awning frame and a supporting frame, includes a operation housing mounted on the supporting frame of the outdoor shading device, wherein the operation housing has a surrounding wall; a control panel being supported on the surrounding wall of the operation housing at a predetermined location for controlling one or more electronic appliances of the outdoor shading device; and an electronic appliance holder assembly for holding at least an electronic appliance thereat and electrically linking with the control panel, wherein the holder assembly is located on the surrounding wall of the operation housing and being arranged that the electronic appliance holder assembly is located at an opposed side of the surrounding wall with respective to the control panel.

U.S. Patent No 20140009103, issued 2014 Jan. 9, to Theresa M. Nita, refers to the present invention relates to a table top, solar-powered charging/electricity providing to renewable devices having a shade structure for outdoor use. The invention having a base structure for stabilizing the device and for providing one or more compartments for storing items therein and/or providing a docking station or cellular phone charging station, a shade structure which contains one or more solar cells attached to an outer surface thereof, an attachment arm which connects the base and the shade structure, and various electronic components operative to convert solar energy into electricity.

U.S. Patent No 20150320162, issued 2015 Nov. 12, to Sarah Akin, describes a solar-powered umbrella has a cap structure that is connected by hinges to struts. The struts are relatively rigid and positioned above the umbrella shade and house solar panels. When the umbrella is opened and closed, the struts rotate via the hinges from an open to closed position. When the solar panels are exposed to the sun, light is converted to electrical energy to charge a rechargeable battery.

U.S. Patent No 20170055653, issued 2017 Mar. 2, to Jiangbo Pan, describes embodiments of the present invention provide an umbrella, comprising: an umbrella frame, an umbrella cloth, solar chips, a storage battery, and an electrical driving mechanism. The umbrella cloth covers the umbrella frame, the solar chips are disposed on an upper surface of the umbrella cloth, the solar chips are electrically connected with the storage battery, and the storage battery provides electrical energy to the electrical driving mechanism disposed on the umbrella frame so that the umbrella frame, driven by the electrical driving mechanism, achieves opening and closing motion.

DISADVANTAGES OF THE PRIOR ART

The prior art have failed to solve many problems associated with such solar-powered charging station, as follows:
1) No prior art mention or disclose any solar-powered charging station,
   having a foldable tiltable device-recharging workstation system.
   Therefore, the prior art of solar-powered charging station:
   a) Can not be quickly and easily moved, or re-adjusted up and down on mobile solar-panel umbrella post to adjust to any respective vertical position needed (FIGS. 5A, 5B, 5C, 6, 7, and 8);
   b) Can not quickly and easily be removed, or installed on mobile solar-panel umbrella post,
      to allow use without any tools necessary;
   c) Can not rotate 360° vertically,
      to adjust to any desired position
      (FIGS. 5A, 5B, 5C, 6, 7, and 8);
   d) Can not operate upside down or any degree,
      to be utilized inverted or upright on mobile solar-panel umbrella post
      (FIGS. 5A, 5B, 5C, 6, 7, and 8);
   e) Can not rotate 360° around the circumference,
      to adjust to any desired position
      (FIGS. 5A, 5B, 5C, 6, 7, and 8);
   f) Can not tilt to any position,
      to accommodate a person viewing a mobile device at an upright vertical, a 180° downward position, or any degree in-between
      (FIGS. 5A, 5B, 5C, 6, 7, and 8); and
   g) Can not instantaneously be folded,
      to be quickly and conveniently be put into storage.
2) No prior art mention or disclose any solar-powered charging station, having a foldable tiltable smart-phone tablet laptop waterproof transparent pouch system. Therefore, the prior art of solar-powered charging station:
  a) Can not conveniently contain a mobile device,
    to store mobile devices while charging
    (FIGS. 3A, 3B, and 3C);
  b) Can not additionally be waterproof,
    to protect a mobile device from liquid damage from a nearby swimming pool, rain, or beverages
    (FIGS. 6, 7, and 7);
  c) Can not conveniently contain mobile devices while studying,
    to provide a hand-free experience and screen is viewable through the foldable tiltable smart-phone tablet laptop waterproof transparent pouch system
    (FIGS. 6, 7, and 7);
  d) Can not conveniently contain mobile device,
    to provide a hand-free experience when multitasking
    (FIGS. 6, 7, and 7);
  e) Can not allow user to type on keyboard through flexible pouch material,
    to accomplish tasks on device hands free, while device is suspended
    (FIGS. 6, 7, and 7);
  f) Can not contain smart phones, tablets, and other mobile devices of any size,
    to accommodate any user's need
    (FIGS. 6, 7, and 7);
  g) Can not conveniently contain mobile device,
    to provide viewing upside down
    (FIGS. 6, 7, and 7);
  h) Can not conveniently contain multiple mobile devices,
    to accommodate charging, storage, and viewing more than one mobile device at the same time
    (FIGS. 6, 7, and 7);
  i) Can not tilt to any position,
    to accommodate a person viewing a mobile device at an upright vertical view, horizontal view, a downward vertical view, or any degree in-between
    (FIGS. 4A, 4B, 4C, 5A, 5B, 6, 7, 8, 11A, and 11B); and
  j) Can not conveniently contain mobile device,
    to provide viewing at any angle
    (FIGS. 4A, 4B, 4C, 5A, 5B, 6, 7, 8, 11A, and 11B).
3) No prior art mention or disclose any solar-powered charging station,
  having a foldable tiltable sun-visor system.
  Therefore, the prior art of solar-powered charging station:
    a) Can not block the sun and protect the skin,
      to help a person view their USB mobile device while charging its battery
      (FIGS. 5A and 5B);
    b) Can not fold away easily,
      to quickly and conveniently be put into storage
      (FIGS. 5A and 5B);
    c) Can not tilt to any position to block the sun,
      to helping a person with any activity, such as playing cards, or taking a nap by the pool
      (FIGS. 5A and 5B);
    d) Can not mount to any vertical position on mobile solar-panel umbrella post,
      to block the sun at any relative height
      (FIGS. 5A and 5B); and
    e) Can not operate in conjunction with multi-function multi-position rotatable foldable tiltable workstation table,
      to offer an extremely large shading area, to block the sun's heat
      (FIGS. 5A and 5B).
4) No prior art mention or disclose any solar-powered charging station,
  having a foldable tiltable cup-holding system.
  Therefore, the prior art of solar-powered charging station:
    a) Can not securely hold beverage cups,
      to keep them stable and out of the way of the table
      (FIGS. 5A and 5B);
    b) Can not securely hold beverage cups,
      to give space for additional beverages or when the table is in use
      (FIGS. 5A and 5B);
    c) Can not instantly be folded,
      to put away for storage, when not needed
      (FIGS. 5A and 5B); and
    d) Can not be installed on mobile solar-panel umbrella post
      (FIGS. 5A and 5B).
5) No prior art mention or disclose any solar-powered charging station,
  having an extendable-retractable-cable system.
  Therefore, the prior art of solar-powered charging station:
    a) Can not perform functions of extending snap-in USB-connector from Spool housing,
      to allow user to charge USB mobile device
      (FIGS. 4A, 4B, and 4C);
    b) Can not perform functions of extending snap-in USB-connector from spool housing,
      to operate the said mobile device at a distance from the charging station
      (FIGS. 4A, 4B, and 4C);
    c) Can not perform functions of extending snap-in USB-connector from spool housing,
      to operate the device on lap, standing nearby, laying on the ground, or needing to attending a child nearby
      (FIGS. 4A, 4B, and 4C); and
    d) Can not allow extended charging capabilities,
      to add to the five-device-in-one solar-powered foldable tiltable device-recharging workstation system, when snap-in USB-connector is snapped into a cable-locking clip.
6) No prior art mention or disclose any solar-powered charging station,
  having a multi-function multi-position rotatable foldable tiltable workstation table.
  Therefore, the prior art of solar-powered charging station:
    a) Can not quickly and easily be moved, or readjusted up and down on mobile solar-panel umbrella post,
      to adjust to any respective vertical level needed
      (FIGS. 5A, 5B 6, 7, and 8);
    b) Can not quickly and easily be removed, or installed on mobile solar-panel umbrella post,
      to detach and reattach without any tools required;
    c) Can not rotate 360° around the circumference of mobile solar-panel umbrella post,
      to be used at desired location
      (FIGS. 5A, 5B 6, 7, and 8);
    d) Can not operate upside down or any degree,
      to be utilized inverted or upright on mobile solar-panel umbrella post
      (FIGS. 5A, 5B 6, 7, and 8);
    e) Can not rotate 360° vertically,
      to be used at desired location
      (FIGS. 5A, 5B 6, 7, and 8); and f) Can not expand and fold instantly,
   to put away for self-storage or when collapsing for transport.
7) No prior art mention or disclose any solar-powered charging station,
   having memory-stick holders.
   Therefore, the prior art of solar-powered charging station:
   a) Can not conveniently hold and store memory-sticks,
      to provide a hands free experience when multitasking;
   b) Can not conveniently hold and store memory-sticks,
      to prevent potential liquid spills from contacting memory-sticks
      (FIGS. 2E and 2F);
   c) Can not conveniently hold and store memory-sticks;
      to temporarily hold memory-sticks while operating another memory-stick in computer device
      (FIGS. 2E and 2F); and
   d) Can not conveniently hold and store memory-sticks;
      to temporarily hold memory-sticks during transport.
8) No prior art mention or disclose any solar-powered charging station,
   having sunglass holders.
   Therefore, the prior art of solar-powered charging station:
   a) Can not conveniently hold and store multiple sunglasses,
      to provide storage for multiple people
      (FIGS. 2E and 2F);
   b) Can not securely hold sunglasses,
      to prevent them from wind damage and being swept away
      (FIGS. 2E and 2F);
   c) Can not provide additional locations to temporarily store sunglasses,
      to participate in other activities
      (FIGS. 2E and 2F); and
   d) Can not conveniently hold and store sunglasses
      to perform other duties at the multi-function multi-position rotatable foldable tiltable workstation.

OBJECTS AND ADVANTAGES OF THE INVENTION

The present invention substantially departs from the conventional concepts and designs of the prior art. In doing so, the present invention provides a five-device-in-one solar-powered foldable tiltable device-recharging sun-blocking-visor workstation system (having: a) Solar-powered electricity-generating-and-storing-system with extendable-retractable-cable system, b) Foldable tiltable device-recharging workstation system, c) Foldable tiltable sun-visor system, d) Foldable tiltable cup-holding system, and e) Foldable tiltable transparent pouch system), having many unique and significant features, functions, and advantages, which overcome all the disadvantages of the prior art, as follows:
1) It is an object of the new invention to provide a five-device-in-one solar-powered foldable tiltable device-recharging sun-blocking-visor workstation system,
   having a foldable tiltable device-recharging workstation system.
   Therefore, the five-device-in-one solar-powered foldable tiltable device-recharging sun-blocking-visor workstation system:
   a) Can be quickly and easily moved, or re-adjusted up and down on mobile solar-panel umbrella post
      to adjust to any respective vertical position needed
      (FIGS. 5A, 5B, 5C, 6, 7, and 8);
   b) Can quickly and easily be removed, or installed on mobile solar-panel umbrella post,
      to allow use without any tools necessary
      (FIGS. 5A, 5B, 5C, 6, 7, and 8);
   c) Can rotate 360° vertically,
      to adjust to any desired position
      (FIGS. 5A, 5B, 5C, 6, 7, and 8);
   d) Can operate upside down or any degree,
      to be utilized inverted or upright on mobile solar-panel umbrella post
      (FIGS. 5A, 5B, 5C, 6, 7, and 8);
   e) Can rotate 360° around the circumference,
      to adjust to any desired position
      (FIGS. 5A, 5B, 5C, 6, 7, and 8);
   f) Can tilt to any position,
      to accommodate a person viewing a mobile device at an upright vertical, a 180° downward position, or any degree in-between
      (FIGS. 5A, 5B, 5C, 6, 7, and 8); and
   g) Can instantaneously be folded,
      to be quickly and conveniently put into storage.
2) It is another object of the new invention to provide a five-device-in-one solar-powered foldable tiltable device-recharging sun-blocking-visor workstation system,
   having a foldable tiltable smart-phone tablet laptop waterproof transparent pouch system.
   Therefore, the five-device-in-one solar-powered foldable tiltable device-recharging sun-blocking-visor workstation system:
   a) Can conveniently contain a mobile device,
      to store mobile devices while charging
      (FIGS. 3A, 3B, and 3C);
   b) Can additionally be waterproof,
      to protect a mobile device from liquid damage from a nearby swimming pool, rain, or beverages
      (FIGS. 6, 7, and 7);
   c) Can conveniently contain mobile devices while studying,
      to provide a hand-free experience and screen is viewable through the foldable tiltable smart-phone tablet laptop waterproof transparent pouch system
      (FIGS. 6, 7, and 7);
   d) Can conveniently contain mobile device,
      to provide a hand-free experience when multitasking
      (FIGS. 6, 7, and 7);
   e) Can allow user to type on keyboard through flexible pouch material,
      to accomplish tasks on device hands free, while device is suspended
      (FIGS. 6, 7, and 7);
   f) Can contain smart phones, tablets, and other mobile devices of any size,
      to accommodate any user's need
      (FIGS. 6, 7, and 7);
   g) Can conveniently contain mobile device,
      to provide viewing upside down
      (FIGS. 6, 7, and 7);
   h) Can conveniently contain multiple mobile devices,
      to accommodate charging, storage, and viewing more than one mobile device at the same time
      (FIGS. 6, 7, and 7);
   i) Can tilt to any position,
      to accommodate a person viewing a mobile device at an upright vertical view, horizontal view, a downward vertical view, or any degree in-between (FIGS. 4A, 4B, 4C, 5A, 5B, 6, 7, 8, 11A, and 11B); and
j) Can conveniently contain mobile device,
to provide viewing at any angle
(FIGS. 4A, 4B, 4C, 5A, 5B, 6, 7, 8, 11A, and 11B).
3) It is still another object of the new invention to provide a five-device-in-one solar-powered foldable tiltable device-recharging sun-blocking-visor workstation system,
having a foldable tiltable sun-visor system.
Therefore, the five-device-in-one solar-powered foldable tiltable device-recharging sun-blocking-visor workstation system:
a) Can block the sun and protect the skin,
to help a person view their USB mobile device while charging its battery
(FIGS. 5A and 5B);
b) Can fold away easily,
to quickly and conveniently be put into storage
(FIGS. 5A and 5B);
c) Can tilt to any position to block the sun,
to helping a person with any activity, such as playing cards, or taking a nap by the pool
(FIGS. 5A and 5B);
d) Can mount to any vertical position on mobile solar-panel umbrella post,
to block the sun at any relative height
(FIGS. 5A and 5B); and
e) Can operate in conjunction with multi-function multi-position rotatable foldable tiltable workstation table,
to offer an extremely large shading area, to block the sun's heat
(FIGS. 5A and 5B).
4) It is a further object of the new invention to provide a five-device-in-one solar-powered foldable tiltable device-recharging sun-blocking-visor workstation system,
having a foldable tiltable cup-holding system.
Therefore, the five-device-in-one solar-powered foldable tiltable device-recharging sun-blocking-visor workstation system:
a) Can securely hold beverage cups,
to keep them stable and out of the way of the table
(FIGS. 5A and 5B);
b) Can securely hold beverage cups,
to give space for additional beverages or when the table is in use
(FIGS. 5A and 5B);
c) Can instantly be folded,
to put away for storage, when not needed
(FIGS. 5A and 5B); and
d) Can be installed on mobile solar-panel umbrella post
(FIGS. 5A and 5B).
5) It is an even further object of the new invention to provide a five-device-in-one solar-powered foldable tiltable device-recharging sun-blocking-visor workstation system,
having an extendable-retractable-cable system.
Therefore, the five-device-in-one solar-powered foldable tiltable device-recharging sun-blocking-visor workstation system:
a) Can perform functions of extending snap-in USB-connector from Spool housing,
to allow user to charge USB mobile device
(FIGS. 4A, 4B, and 4C);
b) Can perform functions of extending snap-in USB-connector from spool housing,
to operate the said mobile device at a distance from the charging station
(FIGS. 4A, 4B, and 4C);
c) Can perform functions of extending snap-in USB-connector from spool housing,
to operate the device on lap, standing nearby, laying on the ground, or needing to attending a child nearby
(FIGS. 4A, 4B, and 4C); and
d) Can allow extended charging capabilities
to add to the five-device-in-one solar-powered foldable tiltable device-recharging sun-blocking-visor workstation system, when snap-in USB-connector is snapped into a cable-locking clip.
6) It is still another object of the new invention to provide a five-device-in-one solar-powered foldable tiltable device-recharging sun-blocking-visor workstation system,
having a multi-function multi-position rotatable foldable tiltable workstation table.
Therefore, the five-device-in-one solar-powered foldable tiltable device-recharging sun-blocking-visor workstation system:
a) Can quickly and easily be moved, or readjusted up and down on mobile solar-panel umbrella post,
to adjust to any respective vertical level needed
(FIGS. 5A, 5B 6, 7, and 8);
b) Can quickly and easily be removed, or installed on mobile solar-panel umbrella post,
to detach and reattach without any tools required;
c) Can rotate 360° around the circumference of mobile solar-panel umbrella post,
to be used at desired location
(FIGS. 5A, 5B 6, 7, and 8);
d) Can operate upside down or any degree,
to be utilized inverted or upright on mobile solar-panel umbrella post
(FIGS. 5A, 5B 6, 7, and 8);
e) Can rotate 360° vertically,
to be used at desired location
(FIGS. 5A, 5B 6, 7, and 8); and
f) Can expand and fold instantly,
to put away for self-storage or when collapsing for transport.
7) It is yet another object of the new invention to provide a five-device-in-one solar-powered foldable tiltable device-recharging sun-blocking-visor workstation system,
having memory-stick holders.
Therefore, the five-device-in-one solar-powered foldable tiltable device-recharging sun-blocking-visor workstation system:
a) Can conveniently hold and store memory-sticks,
to provide a hands free experience when multitasking
(FIGS. 2E and 2F);
b) Can conveniently hold and store memory-sticks,
to prevent potential liquid spills from contacting memory-sticks
(FIGS. 2E and 2F);
c) Can conveniently hold and store memory-sticks;
to temporarily hold memory-sticks while operating another memory-stick in computer device; and
d) Can conveniently hold and store memory-sticks;
to temporarily hold memory-sticks during transport.

8) It is still yet another object of the new invention to provide a five-device-in-one solar-powered foldable tiltable device-recharging sun-blocking-visor workstation system,
   having sunglass holders.
Therefore, the five-device-in-one solar-powered foldable tiltable device-recharging sun-blocking-visor workstation system:
   a) Can conveniently hold and store multiple sunglasses,
      to provide storage for multiple people
      (FIGS. 2E and 2F);
   b) Can securely hold sunglasses,
      to prevent them from being swept away by the wind and damaged
      (FIGS. 2E and 2F);
   c) Can provide additional locations to temporarily store sunglasses,
      to participate in other activities
      (FIGS. 2E and 2F); and
   d) Can conveniently hold and store sunglasses
      to perform other duties at the multi-function multi-position rotatable foldable tiltable workstation.

Other objects and advantages of the present invention will become apparent from a consideration of the accompanying drawings and ensuing description.

BRIEF DESCRIPTION OF THE DRAWINGS

FIG. 3E illustrates a front view of the foldable tiltable device-recharging workstation system and multiple foldable tiltable sun visors in horizontal positions.

FIGS. 3F, 3G, and 3H illustrate side views of how to adjust the foldable tiltable device-recharging workstation system and multiple foldable tiltable sun visors between upward-folded and downward-folded positions.

FIGS. 4B and 4C illustrate side views of how to operate the retractable extendable cable and how to secure a nap-in USB-connector in a USB-connector-securing terminal.

FIG. 5B illustrates a front view of how to tilt the unique five-device-in-one solar-powered foldable tiltable device-recharging sun-blocking-visor workstation system, and how to adjust the foldable tiltable sun-visor system.

FIG. 6 illustrates a side view of how to raise and adjust the unique five-device-in-one solar-powered foldable tiltable device-recharging sun-blocking-visor workstation system for a person (while standing) to work thereon and to interact therewith.

FIG. 7 illustrates a side view of how to lower and adjust the unique five-device-in-one solar-powered foldable tiltable device-recharging sun-blocking-visor workstation system for a person (while laying down on a lawn chair) to work thereon and to interact therewith.

FIGS. 11A and 11B illustrate side views of various positions of the unique five-device-in-one solar-powered foldable tiltable device-recharging sun-blocking-visor workstation system.

SUMMARY OF THE INVENTION

Figure 1A:
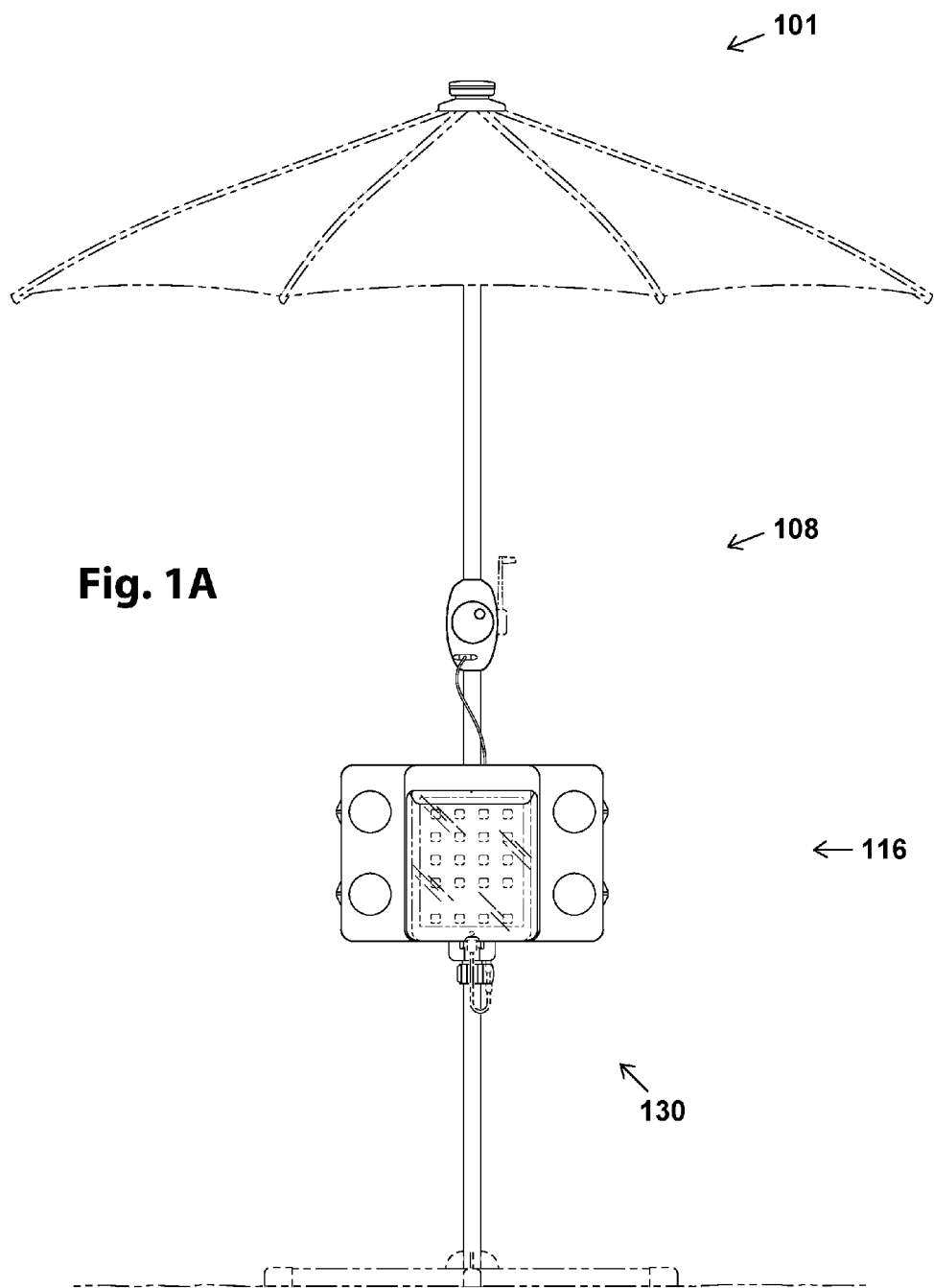
FIG. 1A illustrates a bottom view of the unique five-device-in-one solar-powered foldable tiltable device-recharging sun-blocking-visor workstation system, with a computer table stored inside its waterproof transparent pouch.
Figure 1B:
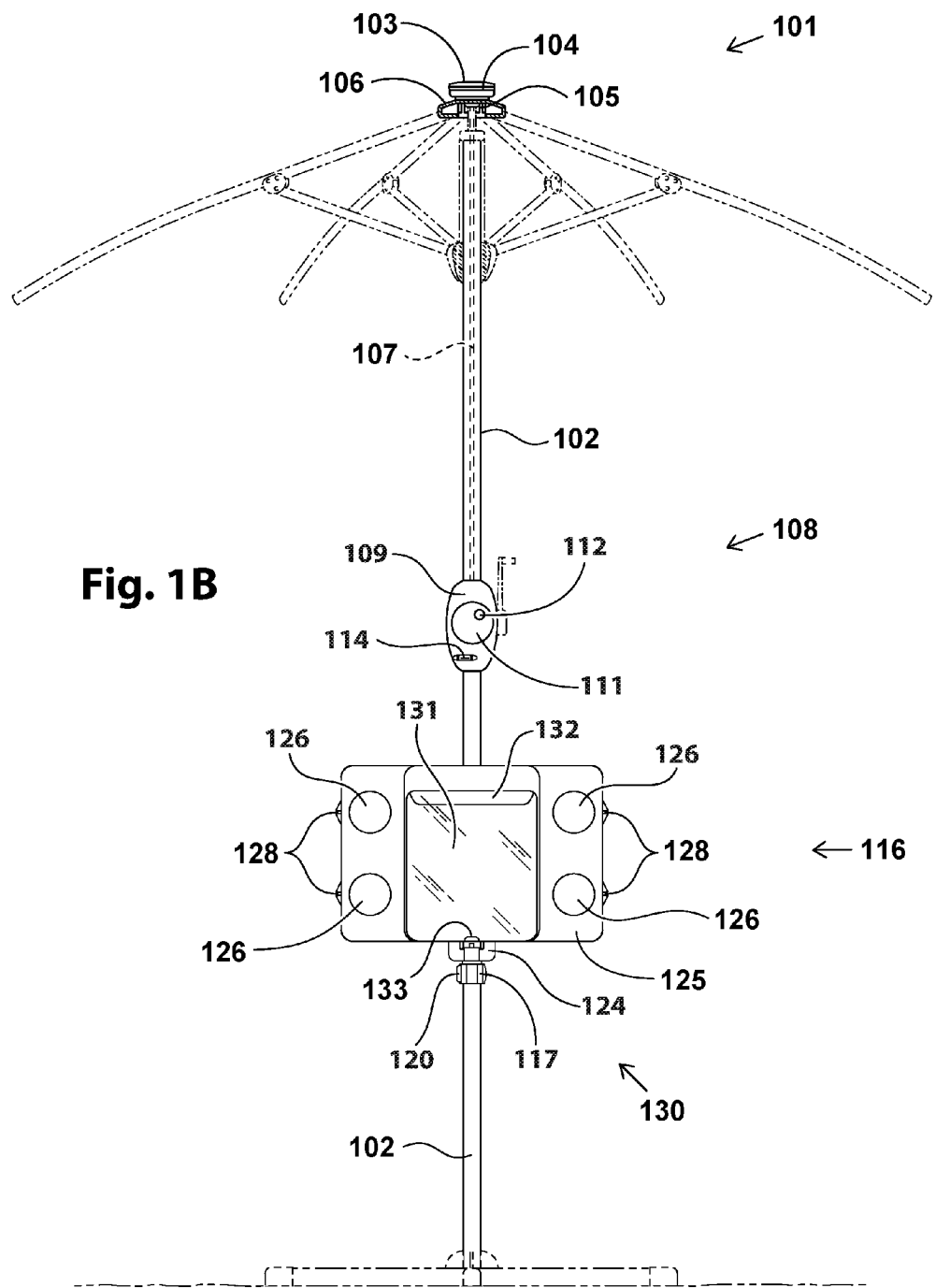
FIG. 1B illustrates a bottom view of the unique five-device-in-one solar-powered foldable tiltable device-recharging sun-blocking-visor workstation system, without a computer table stored inside its waterproof transparent pouch.
Figure 2A:
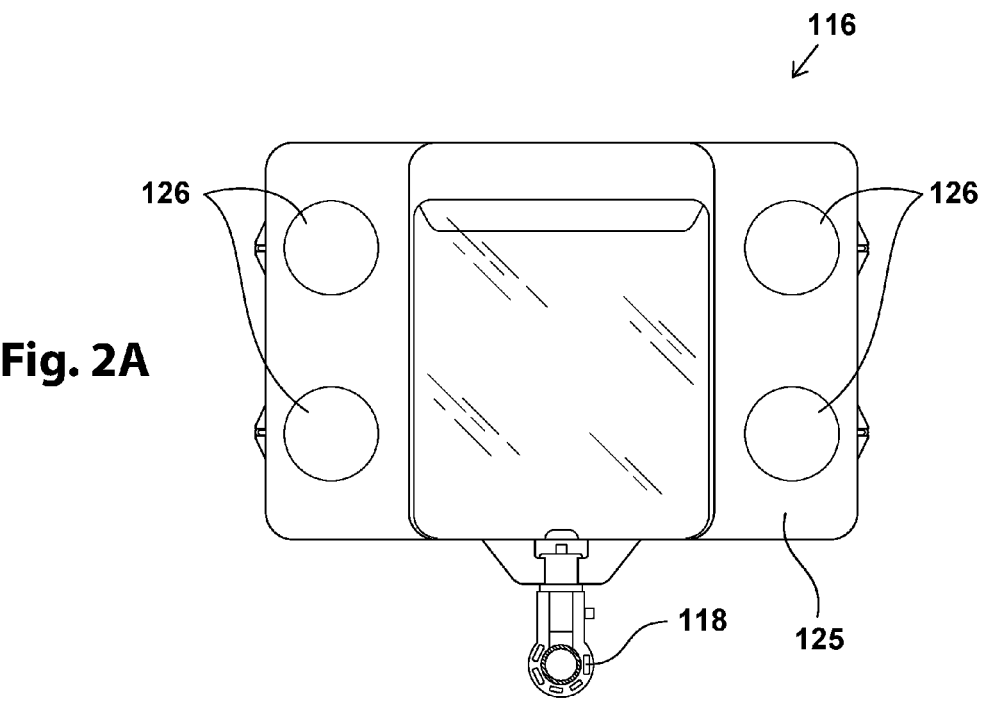
FIGS. 2A and 2B illustrate bottom and top views of a foldable tiltable device-recharging workstation system, respectively.
Figure 2B:
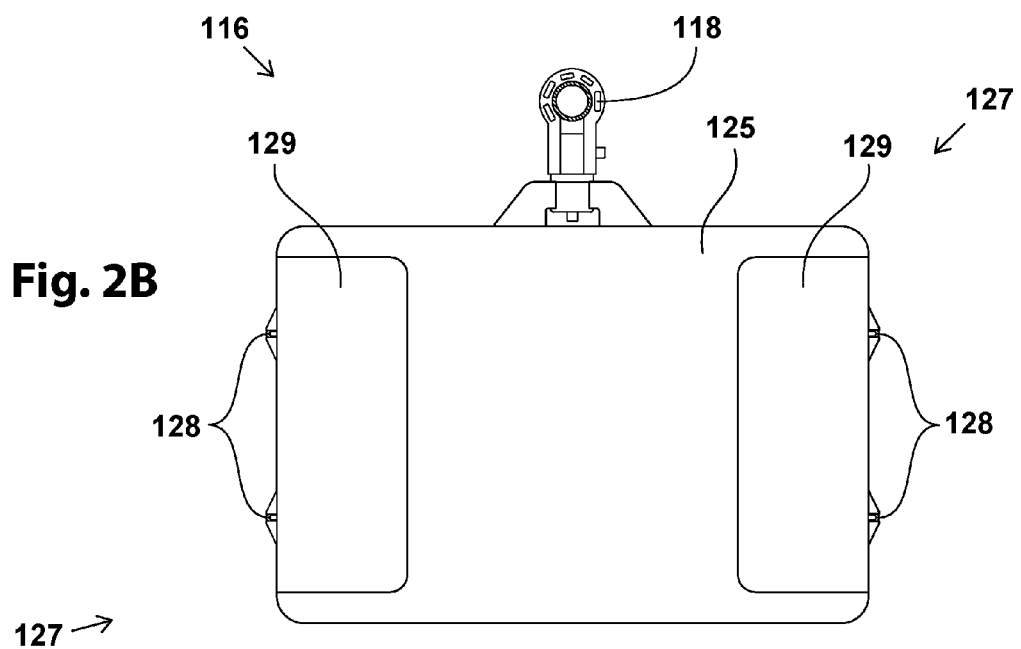
Figure 2C:
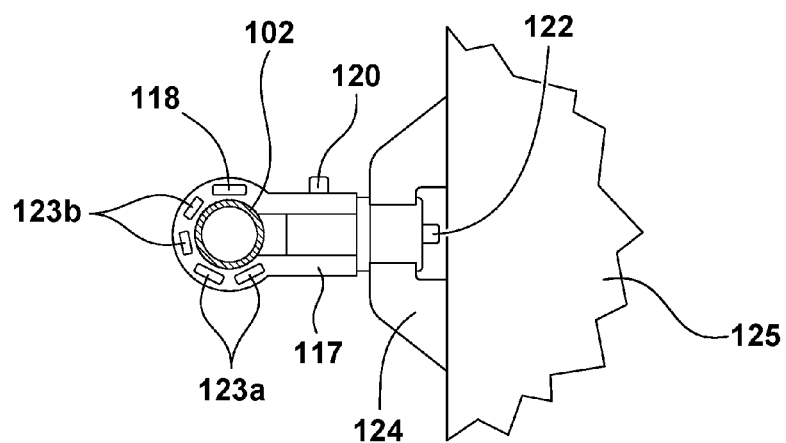
FIGS. 2C and 2D illustrate top views of a multi-elevation 360-degree-adjustable variable-friction clamp and variable-friction tiltable arms.
Figure 2D:
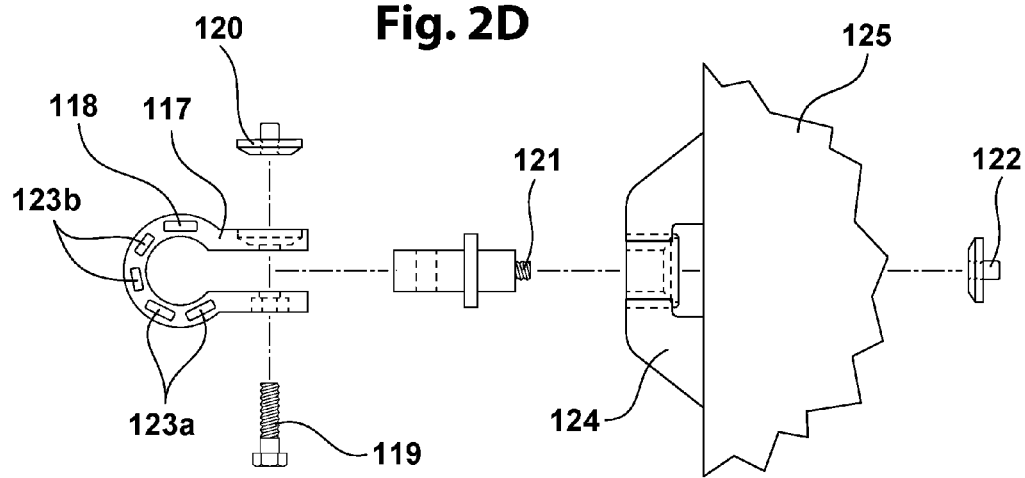
Figure 2E:
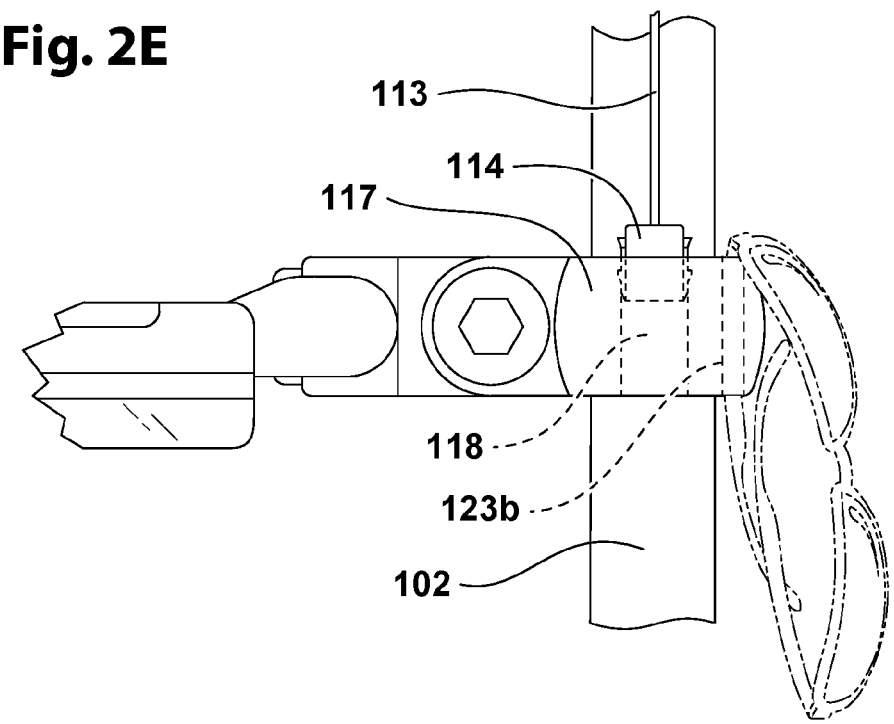
FIGS. 2E and 2F illustrate side views of the multi-elevation 360-degree-adjustable variable-friction clamp and variable-friction tiltable arms.
Figure 2F:
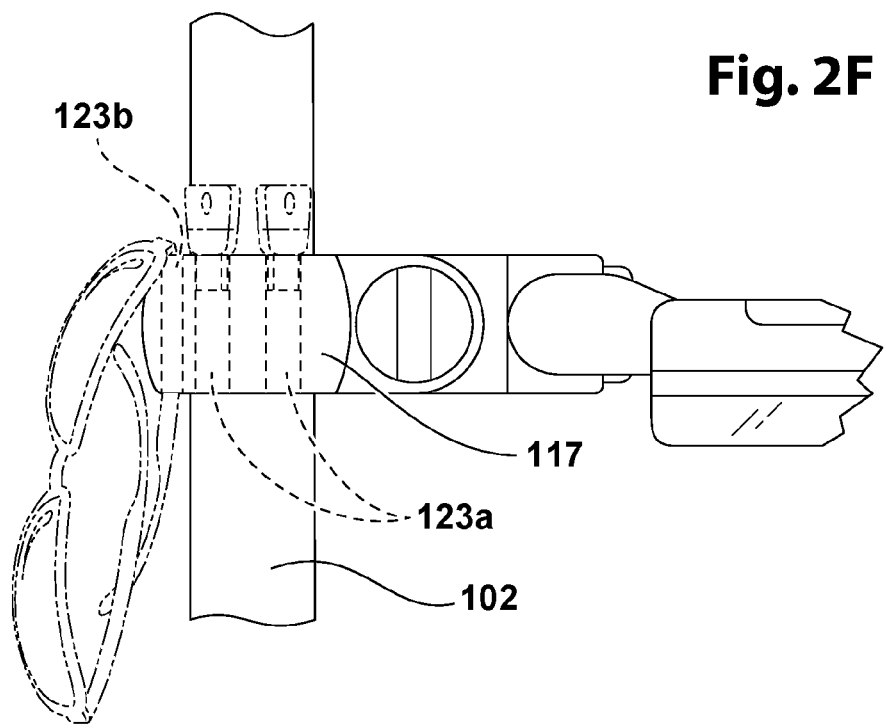

A five-device-in-one solar-charging sun-visor foldable tiltable workstation comprises: an umbrella post, solar panels attached to the umbrella post, an electricity converter connected to the solar panels, a battery connected to the electricity converter for charging mobile devices, an electrical wire connected to the battery, a retractable extendable cable connected to the electrical wire, a spool rotationally connected to the retractable extendable cable, UBS connectors connected to the retractable extendable cable, an adjustable clamp attached to the umbrella post, having memory-stick and sunglass holders, a rotatable foldable tiltable table attached to the adjustable clamp, a foldable tiltable cup-holding system molded in the table for holding drinks in multiple angles, a waterproof transparent hooded pouch attached to the table for holding mobile devices in multiple angles while a user stands, sits, or swim in front of, or lays down under the pouch, and foldable tiltable sun-visors foldably hinged on the table for blocking the sun in multiple angles while a user stands, sits, or swim in front of, or lays down under the pouch.

DETAILED DESCRIPTION OF THE INVENTION

Component

A unique five-device-in-one solar-powered foldable tiltable device-recharging sun-blocking-visor workstation system comprises:
   a) Solar-powered electricity-generating-and-storing system, with extendable-retractable-cable system,
   b) Foldable tiltable device-recharging workstation system,
   c) Foldable tiltable sun-visor system, d) Foldable tiltable cup-holding system, and
e) Foldable tiltable transparent pouch system.

Referring to FIGS. 1A, 1B, 2A, 2B, 2C, 2D, 2E, and 2F, the unique five-device-in-one solar-powered foldable tiltable device-recharging sun-blocking-visor workstation system comprises:

1) Solar-powered electricity-generating-and-storing system 101, comprising:
2) Mobile solar-panel umbrella post 102,
3) Transparent solar-panel housing 103,
4) Solar panel 104,
5) Solar-energy-to-electricity converter 105,
6) Electricity-storing battery 106,
7) Electrical wire 107;
8) Extendable-retractable-cable system 108, comprising:
9) Spool housing 109,
10) Double-rotational-direction spool 110,
11) Finger-receptacle plate 111,
12) Finger-receptacle opening 112,
13) Retractable extendable cable 113,
14) Snap-in USB-connector 114,
15) USB-connector-securing terminal 115;
16) Foldable tiltable device-recharging workstation system 116, comprising:
17) Multi-elevation 360-degree-adjustable variable-friction clamp 117,
18) Cable-locking clip 118,
19) Variable-friction rotatable screw 119,
20) Variable-friction rotatable paddle-nut 120,
21) Variable-friction foldable screw 121,
22) Variable-friction foldable paddle-nut 122,
23) Memory-stick holders 123a and sunglass holders 123b,
24) Variable-friction tiltable arms 124,
25) Multi-function multi-position rotatable foldable tiltable workstation table 125,
26) Foldable tiltable cup-holding system 126;
27) Foldable tiltable sun-visor system 127, comprising:
28) Multi-visor hinges 128,
29) Multiple foldable tiltable sun visors 129; and
30) Foldable tiltable transparent pouch system 130, comprising:
31) Smart-phone tablet laptop waterproof transparent pouch 131,
32) Waterproof-transparent-pouch hood 132, and
33) Waterproof-transparent-pouch cable hole 133.

Material

Referring to FIGS. 1A, 1B, 2A, 2B, 2C, 2D, 2E, and 2F:
1) Solar-powered electricity-generating-and-storing system 101 is made of the combined materials of its components.
2) Mobile solar-panel umbrella post 102 is made of metallic or plastic material.
3) Transparent solar-panel housing 103 is made of metallic or plastic material.
4) Solar panel 104 is made of composite or solar-panel material.
5) Solar-energy-to-electricity converter 105 is made of composite or converter material.
6) Electricity-storing battery 106 is made of composite or battery material.
7) Electrical wire 107 is made of electricity-conducting-and-insulating material.
8) Extendable-retractable-cable system 108 is made of the combined materials of its components.
9) Spool housing 109 is made of metallic or plastic material.
10) Double-rotational-direction spool 110 is made of metallic or plastic material.
11) Finger-receptacle plate 111 is made of metallic or plastic material.
12) Finger-receptacle opening 112 is made of empty space.
13) Retractable extendable cable 113 is made of electricity-conducting-and-insulating material.
14) Snap-in USB-connector 114 is made of electricity-conducting-and-insulating material.
15) USB-connector-securing terminal 115 is made of metallic or plastic space.
16) Foldable tiltable device-recharging workstation system 116 is made of the combined materials of its components.
17) Multi-elevation 360-degree-adjustable variable-friction clamp 117 is made of metallic or plastic material.
18) Cable-locking clip 118 is made of metallic or plastic material.
19) Variable-friction rotatable screw 119 is made of metallic or plastic material.
20) Variable-friction rotatable paddle-nut 120 is made of metallic or plastic material.
21) Variable-friction foldable screw 121 is made of metallic or plastic material.
22) Variable-friction foldable paddle-nut 122 is made of metallic or plastic material.
23) Memory-stick holders 123a and sunglass holders 123b, each are made of metallic or plastic material.
24) Variable-friction tiltable arms 124 each are made of metallic or plastic material.
25) Multi-function multi-position rotatable foldable tiltable workstation table 125 is made of metallic or plastic material.
26) Foldable tiltable cup-holding system 126 is made of empty space.
27) Foldable tiltable sun-visor system 127 is made of the combined materials of its components.
28) Multi-visor hinges 128 each are made of metallic or plastic material.
29) Multiple sun visors 129 each are made of metallic or plastic material.
30) Foldable tiltable transparent pouch system 130 is made of the combined materials of its components.
31) Smart-phone tablet laptop waterproof transparent pouch 131 is made of flexible transparent built-in-net material.
32) Waterproof-transparent-pouch hood 132 is made of flexible transparent built-in-net material.
33) Waterproof-transparent-pouch cable hole 133 is made of empty space.

Shape

Referring to FIGS. 1A, 1B, 2A, 2B, 2C, 2D, 2E, and 2F:
1) Solar-powered electricity-generating-and-storing system 101 has the combined shapes of its components.
2) Mobile solar-panel umbrella post 102 has a tubular shape.
3) Transparent solar-panel housing 103 has a dome shape.
4) Solar panel 104 has a round shape.
5) Solar-energy-to-electricity converter 105 has a box shape.
6) Electricity-storing battery 106 has a box shape.
7) Electrical wire 107 has a cable shape.
8) Extendable-retractable-cable system 108 has the combined shapes of its components.
9) Spool housing 109 has an egg shape with two opposite flatten ends.
10) Double-rotational-direction spool 110 has a spool shape.
11) Finger-receptacle plate 111 has a round shape.
12) Finger-receptacle opening 112 has a round shape.
13) Retractable extendable cable 113 has a cable shape.
14) Snap-in USB-connector 114 has a rectangular shape.
15) USB-connector-securing terminal 115 has an oval shape.

16) Foldable tiltable device-recharging workstation system 116 has the combined shapes of its components.
17) Multi-elevation 360-degree-adjustable variable-friction clamp 117 has a U shape.
18) Cable-locking clip 118 has a rectangular shape.
19) Variable-friction rotatable screw 119 has a screw shape.
20) Variable-friction rotatable paddle-nut 120 has a wing-nut shape.
21) Variable-friction foldable screw 121 has a donut-head-screw shape.
22) Variable-friction foldable paddle-nut 122 has a wing-nut shape.
23) Memory-stick holders 123*a* and sunglass holders 123*b*, each have a doughnut shape.
24) Variable-friction tiltable arms 124 each have a V shape.
25) Multi-function multi-position rotatable foldable tiltable workstation table 125 has a rectangular shape.
26) Foldable tiltable cup-holding system 126 has a combination of round shapes.
27) Foldable tiltable sun-visor system 127 has the combined shapes of its components.
28) Multi-visor hinges 128 each have a hinge shape.
29) Multiple sun visors 129 each have a rectangular shape.
30) Foldable tiltable transparent pouch system 130 has the combined shapes of its components.
31) Smart-phone tablet laptop waterproof transparent pouch 131 has a rectangular shape.
32) Waterproof-transparent-pouch hood 132 has a trapezoidal shape.
33) Waterproof-transparent-pouch cable hole 133 has a round shape.

Connection

Referring to FIGS. 1A, 1B, 2A, 2B, 2C, 2D, 2E, and 2F:
1) Solar-powered electricity-generating-and-storing system 101 has the combined connections of it components.
2) Mobile solar-panel umbrella post 102 is connected to multi-elevation 360-degree adjustable variable-friction clamp 117.
3) Transparent solar-panel housing 103 is connected to mobile solar-panel umbrella post 102.
4) Solar panel 104 is connected to solar-energy-to-electricity converter 105.
5) Solar-energy-to-electricity converter 105 is connected to electricity-storing battery 106.
6) Electricity-storing battery 106 is connected to electrical wire 107
7) Electrical wire 107 is connected to retractable extendable cable 113.
8) Extendable-retractable-cable system 108 has the combined connections of it components.
9) Spool housing 109 is connected to mobile solar-panel umbrella post 102.
10) Double-rotational-direction spool 110 is rotationally connected to spool housing 109.
11) Finger-receptacle plate 111 is connected to double-rotational-direction spool 110.
12) Finger-receptacle opening 112 is molded in finger-receptacle plate 111.
13) Retractable extendable cable 113 is connected to electrical wire 107.
14) Snap-in USB-connector 114 is connected to retractable extendable cable 113.
15) USB-connector-securing terminal 115 is molded to spool housing 109.
16) Foldable tiltable device-recharging workstation system 116 has the combined connections of it components.
17) Multi-elevation 360-degree-adjustable variable-friction clamp 117 is attached to mobile solar-panel umbrella post 102.
18) Cable-locking clip 118 is molded on multi-elevation 360-degree-adjustable variable-friction clamp 117.
19) Variable-friction rotatable screw 119 is rotationally screwed through both ends of multi-elevation 360-degree-adjustable variable-friction clamp 117.
20) Variable-friction rotatable paddle-nut 120 is rotationally screwed on variable-friction rotatable screw 119.
21) Variable-friction foldable screw 121 is foldably slid on variable-friction rotatable screw 119.
22) Variable-friction foldable paddle-nut 122 is foldably screwed on variable-friction foldable screw 121.
23) Memory-stick holders 123*a* respectively are molded on multi-elevation 360-degree-adjustable variable-friction clamp 117.
   Sunglass holders 123*b* respectively are molded on multi-elevation 360-degree-adjustable variable-friction clamp 117.
24) Variable-friction tiltable arms 124 is tiltably slid on variable-friction foldable screw 121.
25) Multi-function multi-position rotatable foldable tiltable workstation table 125 is molded to variable-friction tiltable arms 124.
26) Foldable tiltable cup-holding system 126 is molded in multi-function multi-position rotatable foldable tiltable workstation table 125.
27) Foldable tiltable sun-visor system 127 has the combined connections of it components.
28) Multi-visor hinges 128 is molded to multi-function multi-position rotatable foldable tiltable workstation table 125.
29) Multiple sun visors 129 are foldably hinged on multi-visor hinges 128.
30) Foldable tiltable transparent pouch system 130 has the combined connections of it components.
31) Smart-phone tablet laptop waterproof transparent pouch 131 is glued to the undersurface of multi-function multi-position rotatable foldable tiltable workstation table 125.
32) Waterproof-transparent-pouch hood 132 is attached to smart-phone tablet laptop waterproof transparent pouch 131.
33) Waterproof-transparent-pouch cable hole 133 is cut in the bottom of smart phone tablet laptop waterproof transparent pouch 131.

Function

Referring to FIGS. 1A, 1B, 2A, 2B, 2C, 2D, 2E, and 2F:
1) Solar-powered electricity-generating-and-storing system 101 is for performing the combined functions of its components.
2) Mobile solar-panel umbrella post 102 is for:
   Supporting solar panel 104, solar-energy-to-electricity converter 105, electricity-storing battery 106, an umbrella canopy, and multi-function multi-position rotatable foldable tiltable workstation table 125.
3) Transparent solar-panel housing 103 is for:
   Housing solar panel 104, solar-energy-to-electricity converter 105, and electricity-storing battery 106.
4) Solar panel 104 is for:
   Receiving solar energy.
5) Solar-energy-to-electricity converter 105 is for:
   Converting solar energy into electricity.
6) Electricity-storing battery 106 is for:
   Storing electricity.
7) Electrical wire 107 is for:

Conveying electricity from electricity-storing battery 106 to retractable extendable cable 113.
8) Extendable-retractable-cable system 108 is for performing the combined functions of its components.
9) Spool housing 109 is for:
   Housing double-rotational-direction spool 110 and retractable extendable cable 113.
10) Double-rotational-direction spool 110 is for:
    Winding retractable extendable cable 113 thereon.
11) Finger-receptacle plate 111 is for:
    Rotating double-rotational-direction spool 110.
12) Finger-receptacle opening 112 is for:
    Inserting a finger therein to rotate finger-receptacle plate 111 and double-rotational-direction spool 110 in a cable-winding direction or in a cable-unwinding direction.
13) Retractable extendable cable 113 is for:
    Retracting to be wound on double-rotational-direction spool 110, and
    Extending to offer convenience to convey electricity to charge and recharge a smart phone, a tablet, a laptop, etc.
14) Snap-in usb-connector 114 is for:
    Plugging in a receiver on a smart phone, a tablet, a laptop, etc to charge and recharge them.
15) Usb-connector-securing terminal 115 is for:
    Securing snap-in usb-connector 114 to spool housing 109 when not in use.
16) Foldable tiltable device-recharging workstation system 116 is for performing the combined functions of its components.
17) Multi-elevation 360-degree-adjustable variable-friction clamp 117 is for:
    Releasably, elevationally, and adjustably clamping foldable tiltable device-recharging workstation system 116 at different elevations and 360 degrees different locations on mobile solar-panel umbrella post 102.
18) Cable-locking clip 118 is for:
    Clipping retractable extendable cable 113 to multi-elevation 360-degree-adjustable variable-friction clamp 117.
19) Variable-friction rotatable screw 119 is for:
    Allowing multi-elevation 360-degree-adjustable variable-friction clamp 117 to rotatably be attached to mobile solar-panel umbrella post 102.
20) Variable-friction rotatable paddle-nut 120 is for:
    Adjusting the frictional force multi-elevation 360-degree-adjustable variable-friction clamp 117 exerts on variable-friction foldable screw 121.
21) Variable-friction foldable screw 121 is for:
    Allowing variable-friction tiltable arms 124 to foldably be attached to multi-elevation 360-degree-adjustable variable-friction clamp 117.
22) Variable-friction foldable paddle-nut 122 is for:
    Adjusting the frictional force variable-friction foldable screw 121 exerts on variable-friction tiltable arms 124.
23) Memory-stick holders 123*a* respectively are for:
    Holding memory sticks therein.
    Sunglass holders 123*b* respectively are for:
    holding sunglasses therein.
24) Variable-friction tiltable arms 124 is for:
    Allowing multi-function multi-position rotatable foldable tiltable workstation table 125 to foldably and tiltably be attached to multi-elevation 360-degree-adjustable variable-friction clamp 117.
25) Multi-function multi-position rotatable foldable tiltable workstation table 125 is for:
    Charging a smart phone, a tablet, a laptop, etc. Thereon:
    a) For a standing-up person,
    b) For a sitting-up person,
    c) For a laying-down person, and
    d) For an in-swimming-pool person;
    Supporting a smart phone, a tablet, a laptop, etc. Thereon:
    a) For a standing-up person,
    b) For a sitting-up person,
    c) For a laying-down person, and
    d) For an in-swimming-pool person;
    Holding a smart phone, a tablet, a laptop, etc. Thereon:
    a) For a standing-up person,
    b) For a sitting-up person,
    c) For a laying-down person, and
    d) For an in-swimming-pool person;
    Protecting a smart phone, a tablet, a laptop, etc. Thereon:
    a) For a standing-up person,
    b) For a sitting-up person,
    c) For a laying-down person, and
    d) For an in-swimming-pool person;
26) Foldable tiltable cup-holding system 126 is for:
    Holding cups, glasses, and the likes therein.
27) Foldable tiltable sun-visor system 127 is for performing the combined functions of its components.
28) Multi-visor hinges 128 respectively are for:
    Foldably and tiltably attaching multiple sun visors 129 to multi-function multi-position rotatable foldable tiltable workstation table 125.
29) Multiple sun visors 129 respectively are for:
    Foldably and tiltably blocking the sun from a person's eyes.
30) Foldable tiltable transparent pouch system 130 is for performing the combined functions of its components.
31) Smart-phone tablet laptop waterproof transparent pouch 131 is for:
    Charging a smart phone, a tablet, a laptop, etc. therein:
    a) For a standing-up person,
    b) For a sitting-up person,
    c) For a laying-down person, and
    d) For an in-swimming-pool person;
    Supporting a smart phone, a tablet, a laptop, etc. therein:
    a) For a standing-up person,
    b) For a sitting-up person,
    c) For a laying-down person, and
    d) For an in-swimming-pool person;
    Holding a smart phone, a tablet, a laptop, etc. therein:
    a) For a standing-up person,
    b) For a sitting-up person,
    c) For a laying-down person, and
    d) For an in-swimming-pool person;
    Protecting a smart phone, a tablet, a laptop, etc. therein:
    a) For a standing-up person,
    b) For a sitting-up person,
    c) For a laying-down person, and
    d) For an in-swimming-pool person;
32) Waterproof-transparent-pouch hood 132 is for:
    Protecting a smart phone, a tablet, a laptop, etc from weather elements.
33) Waterproof-transparent-pouch cable hole 133 is for:
    Threading retractable extendable cable 113 or a cable (of a smart phone, a tablet, a laptop, etc.) therethrough.

Operation

The operation of the unique five-device-in-one solar-powered foldable tiltable device-recharging sun-blocking-visor workstation system comprises the following steps:
How to Store and Operate Smart Phone, Tablet, and Laptop (FIGS. 3A, 3B, 3C, 3D, 3E, 3F, 3G, and 3H)

Figure 3A:
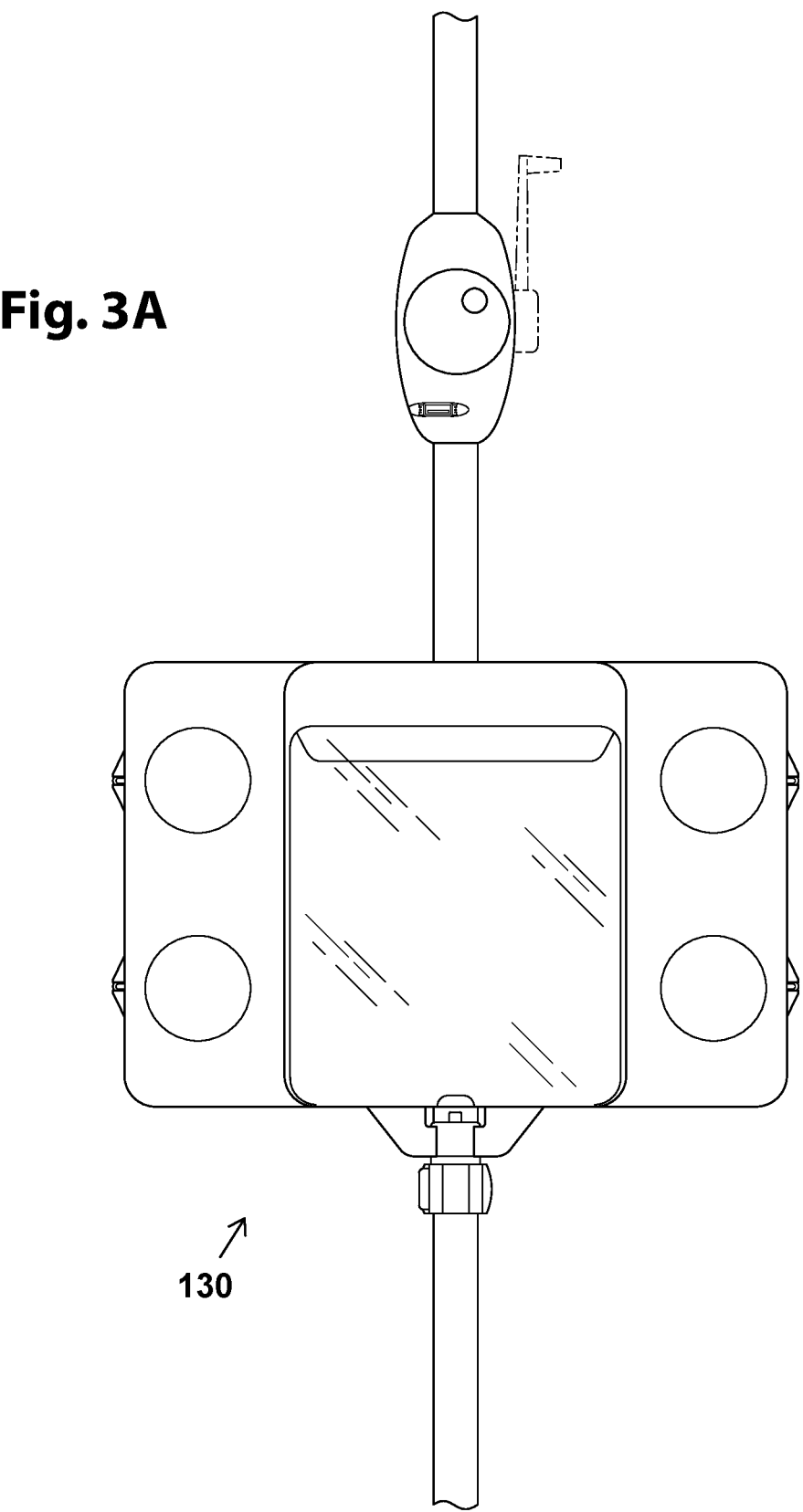
FIG. 3A illustrates a front view of the waterproof transparent pouch.
Figure 3B:
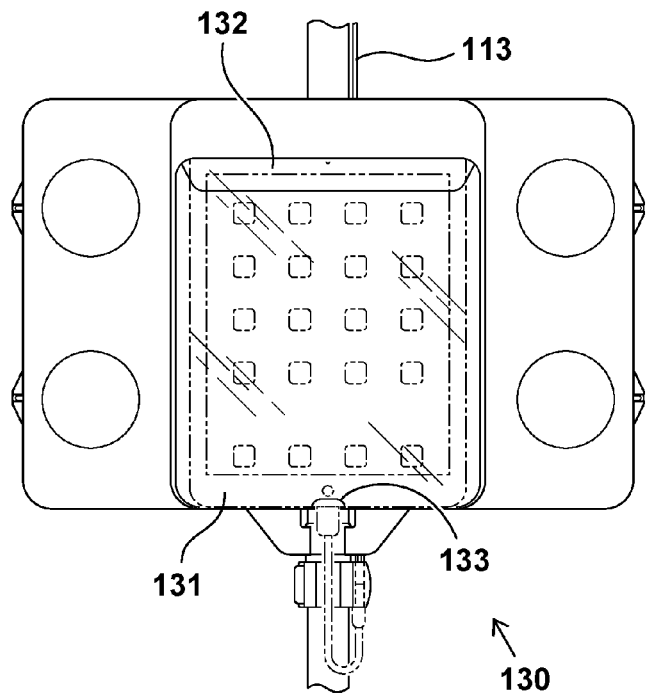
FIGS. 3B and 3C illustrate front views of the waterproof transparent pouch storing a computer tablet and a smart phone while recharging them, respectively.
Figure 3C:
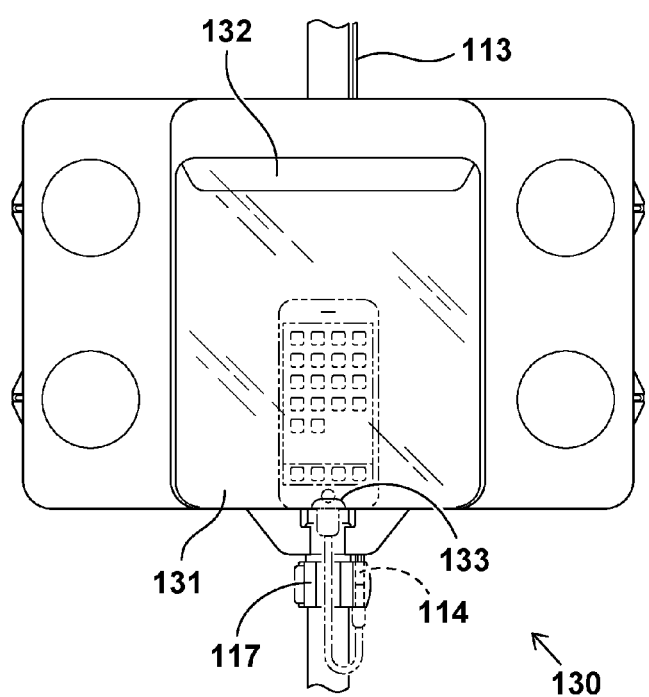
Figure 3D:
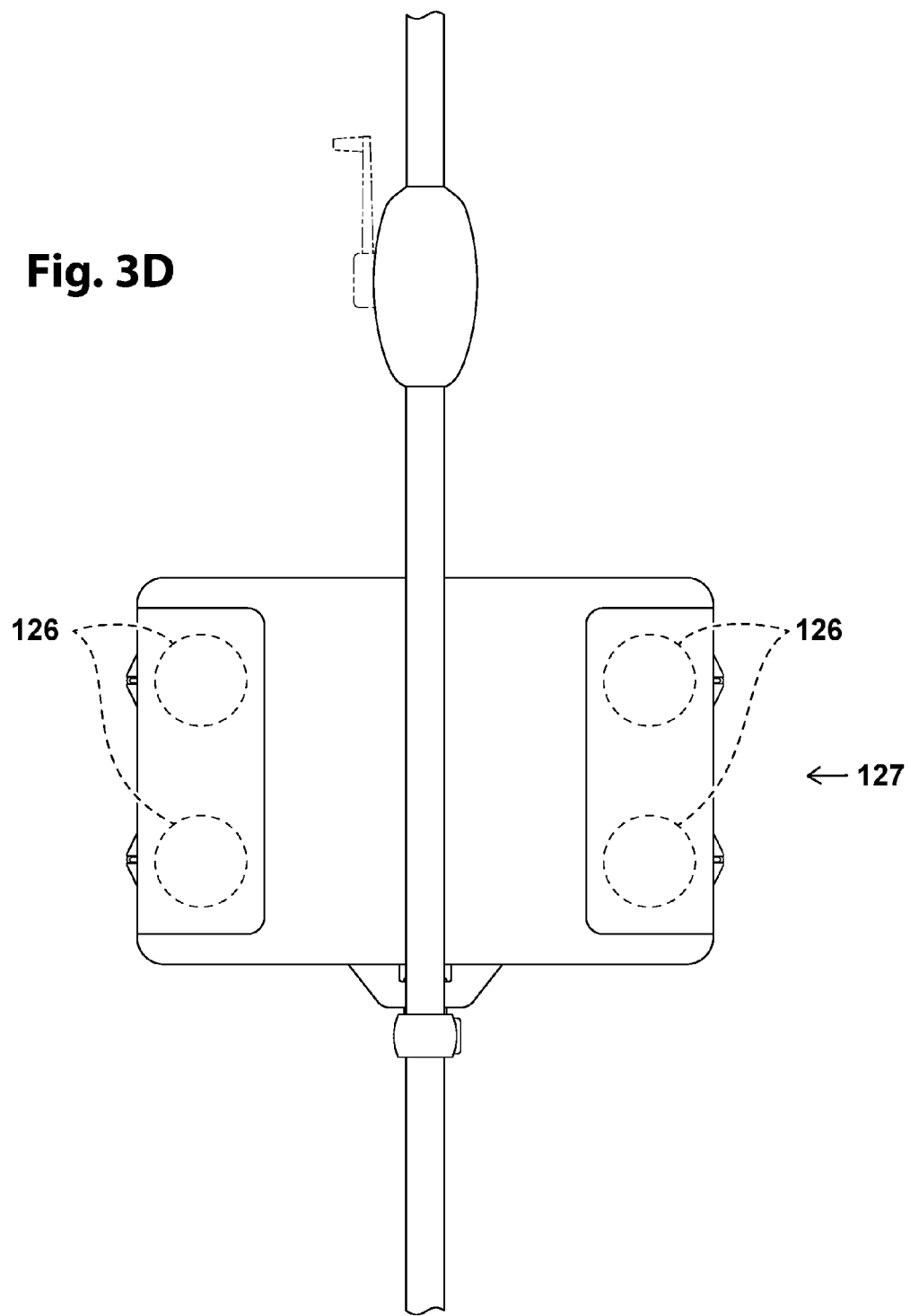
FIG. 3D illustrates a top view of the foldable tiltable device-recharging workstation system and multiple foldable tiltable sun visors in upward-folded positions.
Figure 3H:
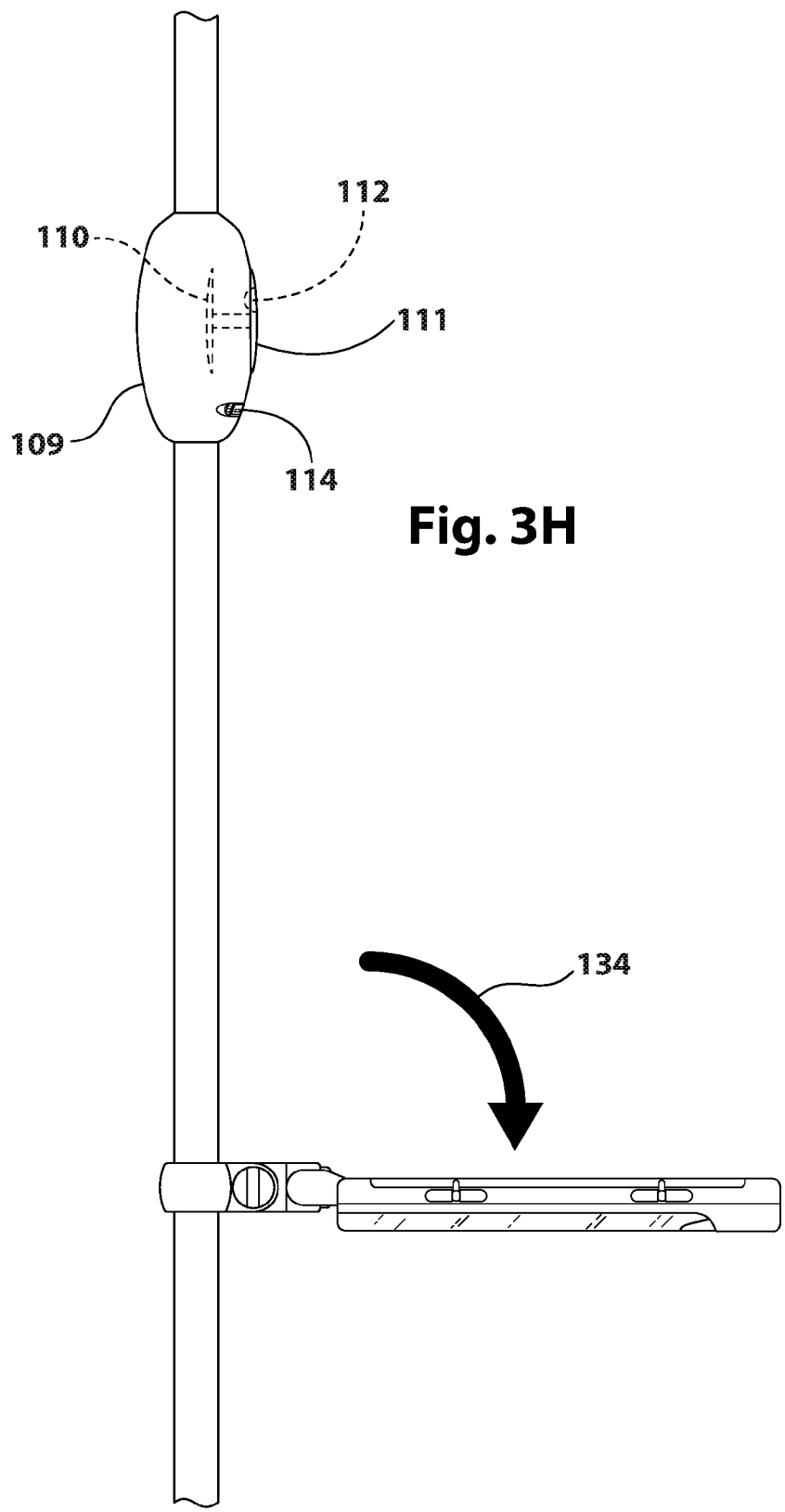
Figure 4A:
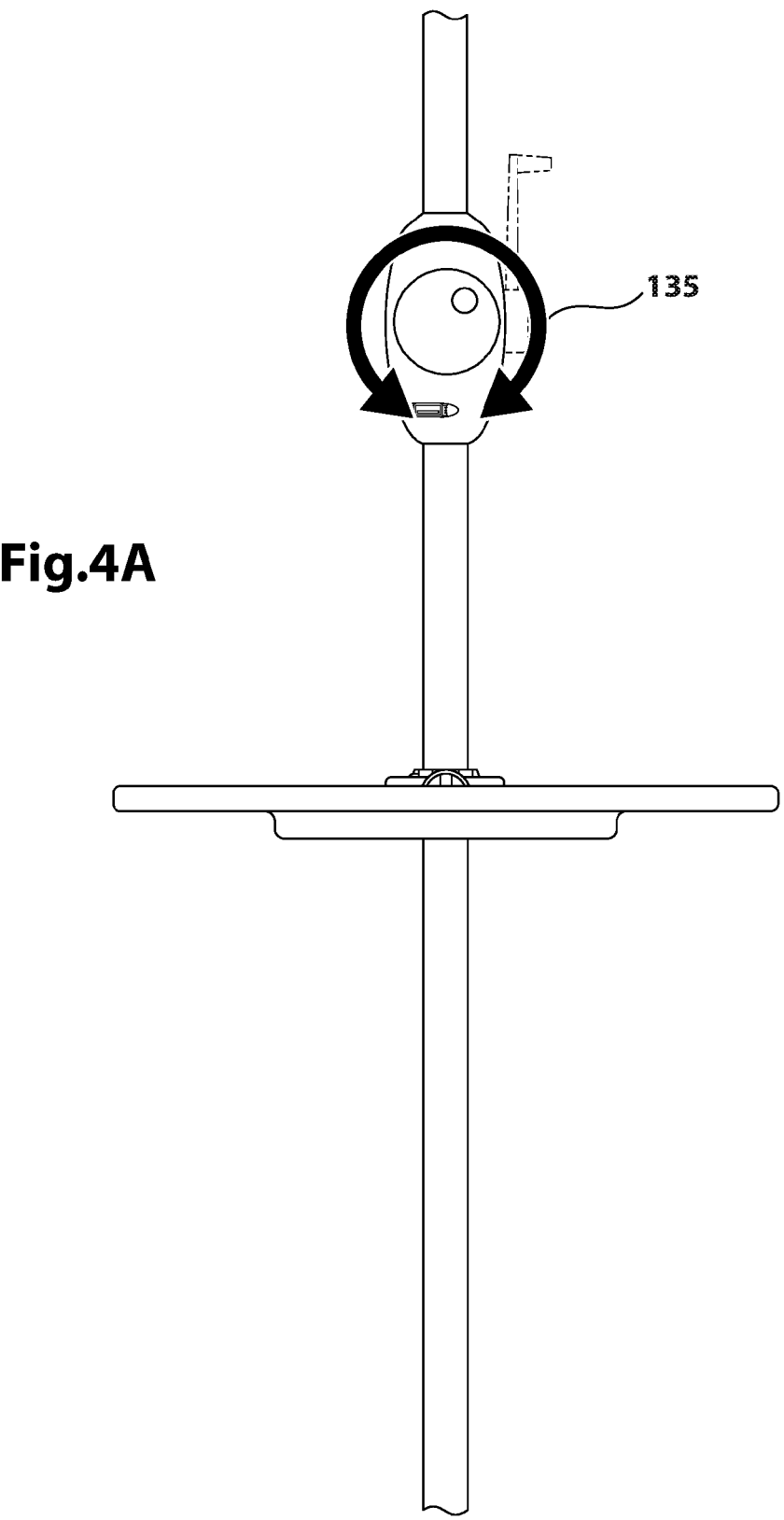
FIG. 4A illustrates a front view of How to rotate a finger-receptacle plate to rotate a double-rotational-direction spool to wind and unwind a retractable extendable cable.
Figure 5A:
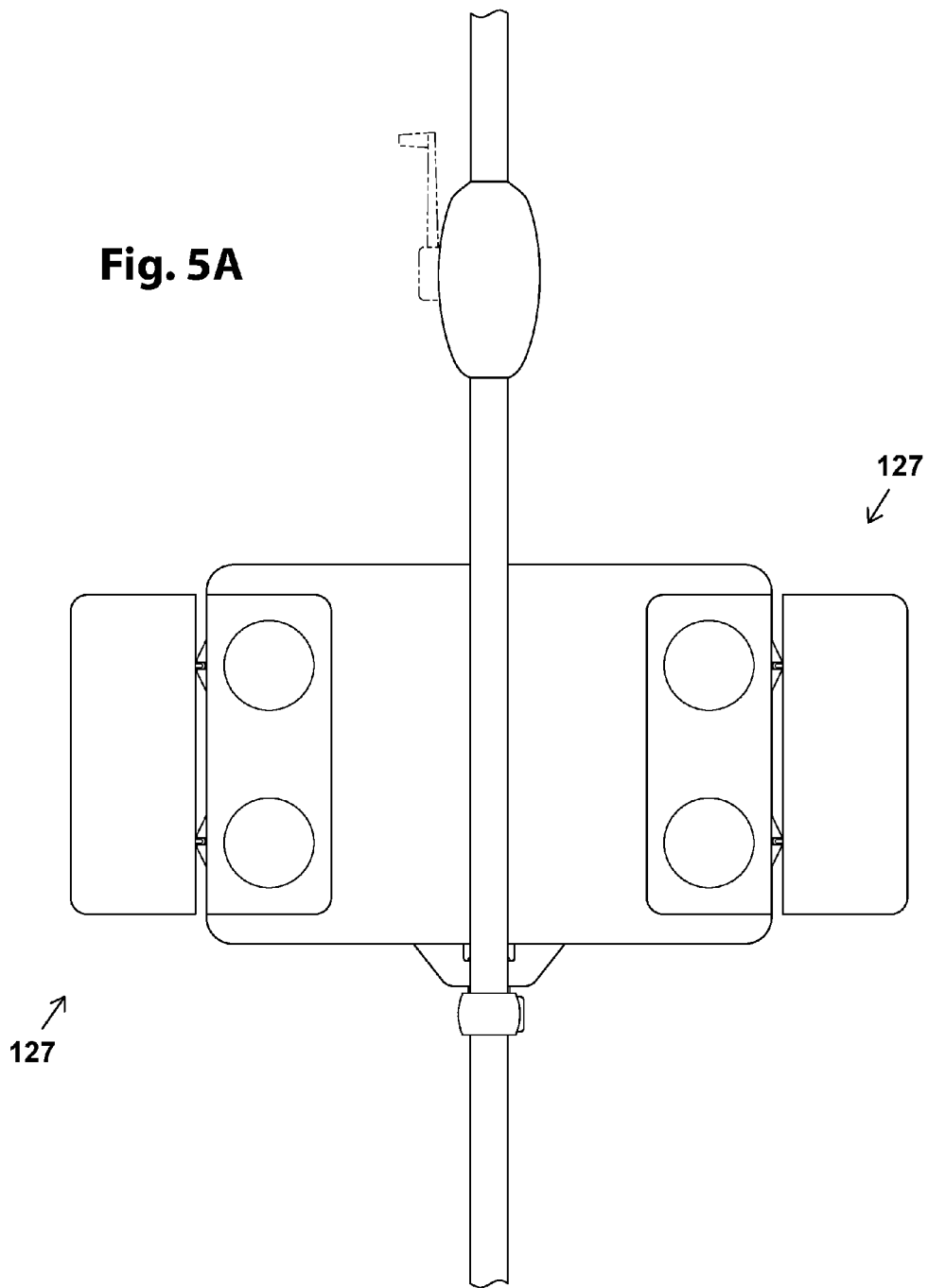
FIG. 5A illustrates a top view of the foldable tiltable sun-visor system in outward-folded positions.
Figure 8:
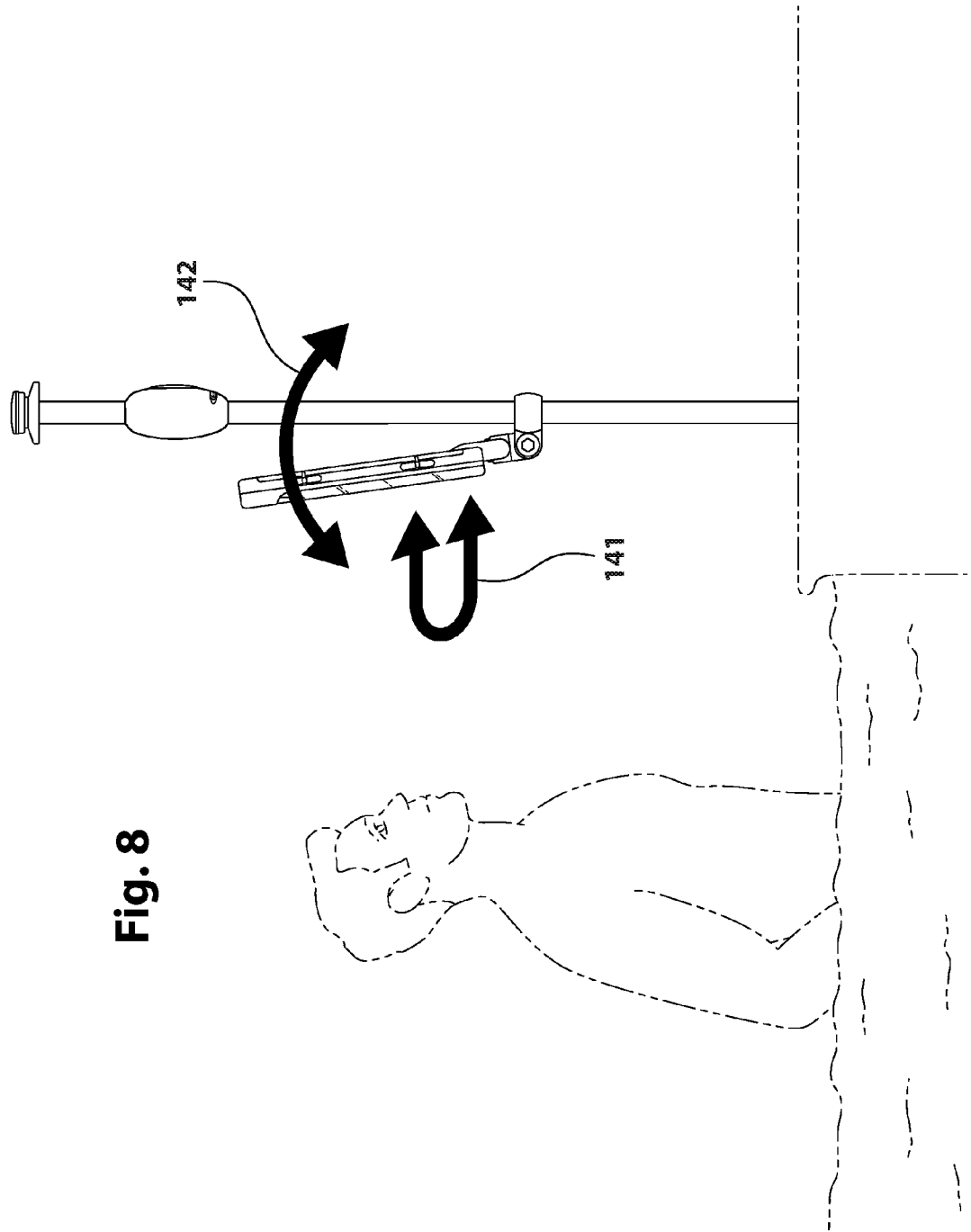
FIG. 8 illustrates a side view of how to lower and adjust the unique five-device-in-one solar-powered foldable tiltable device-recharging sun-blocking-visor workstation system for a person (while in a swimming pool) to work thereon and to interact therewith.
Figure 9:
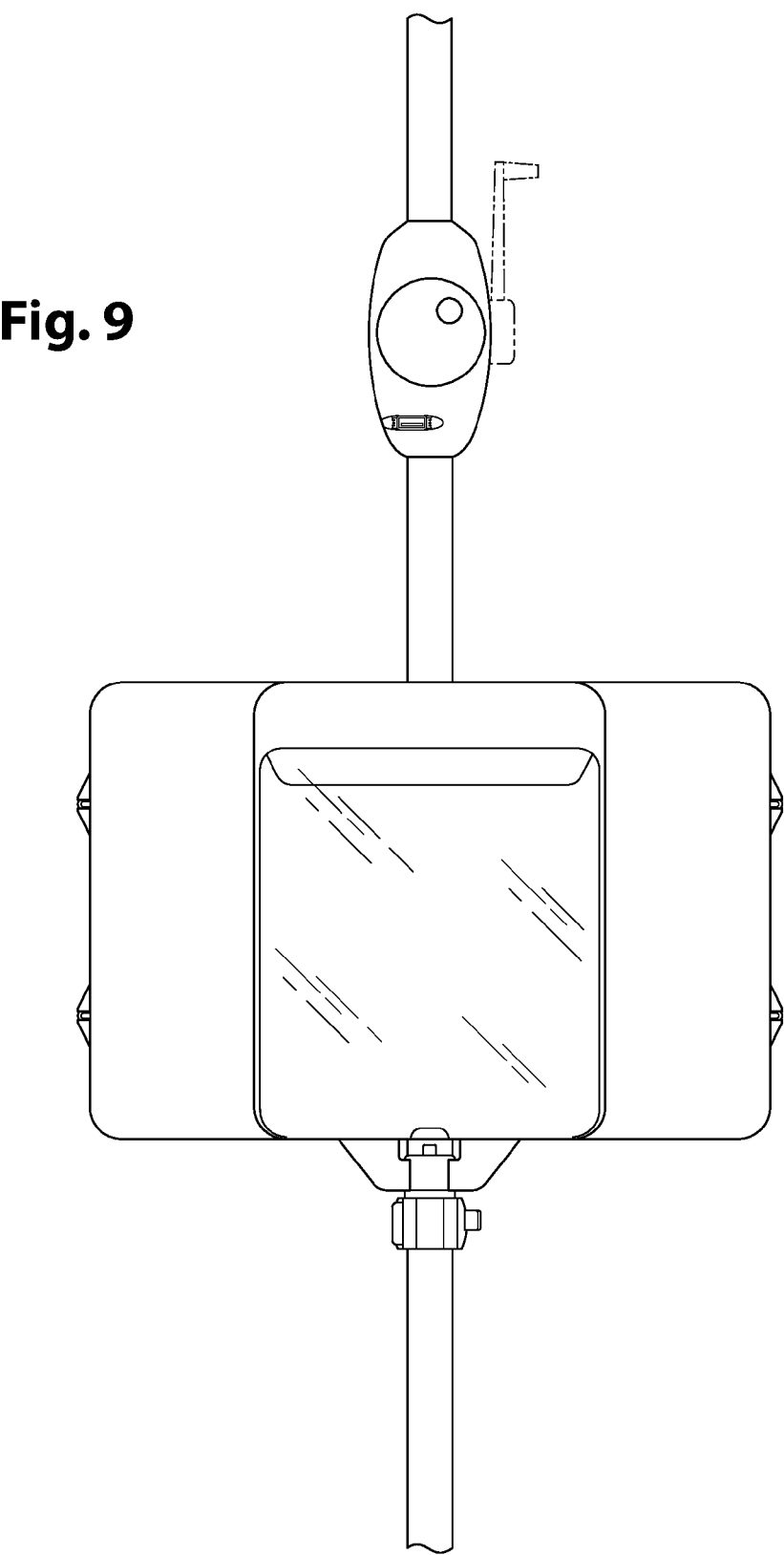
FIGS. 9 and 10 illustrate front views of variations of the unique five-device-in-one solar-powered foldable tiltable device-recharging sun-blocking-visor workstation system.
Figure 10:
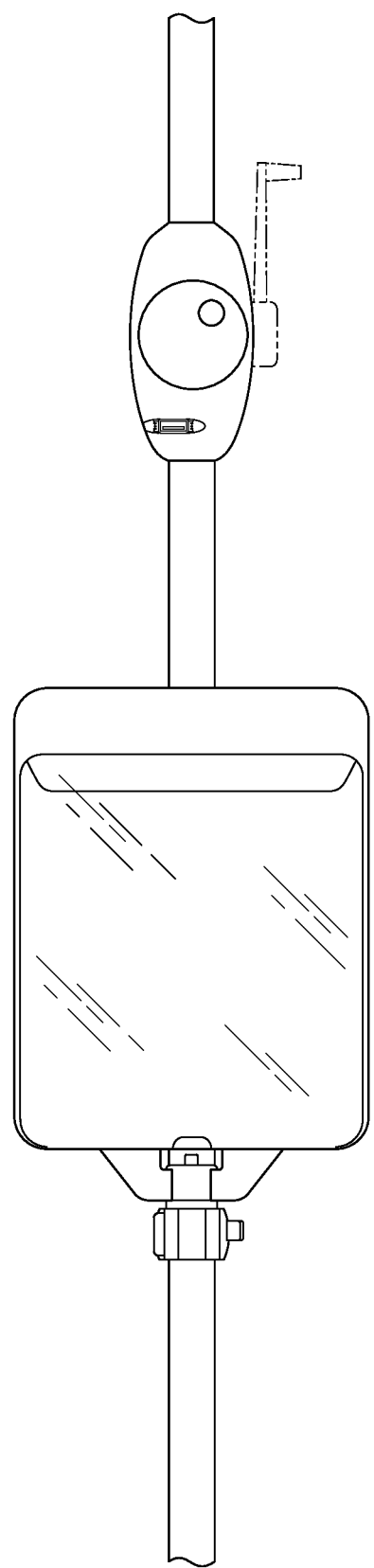
Figure 11A:
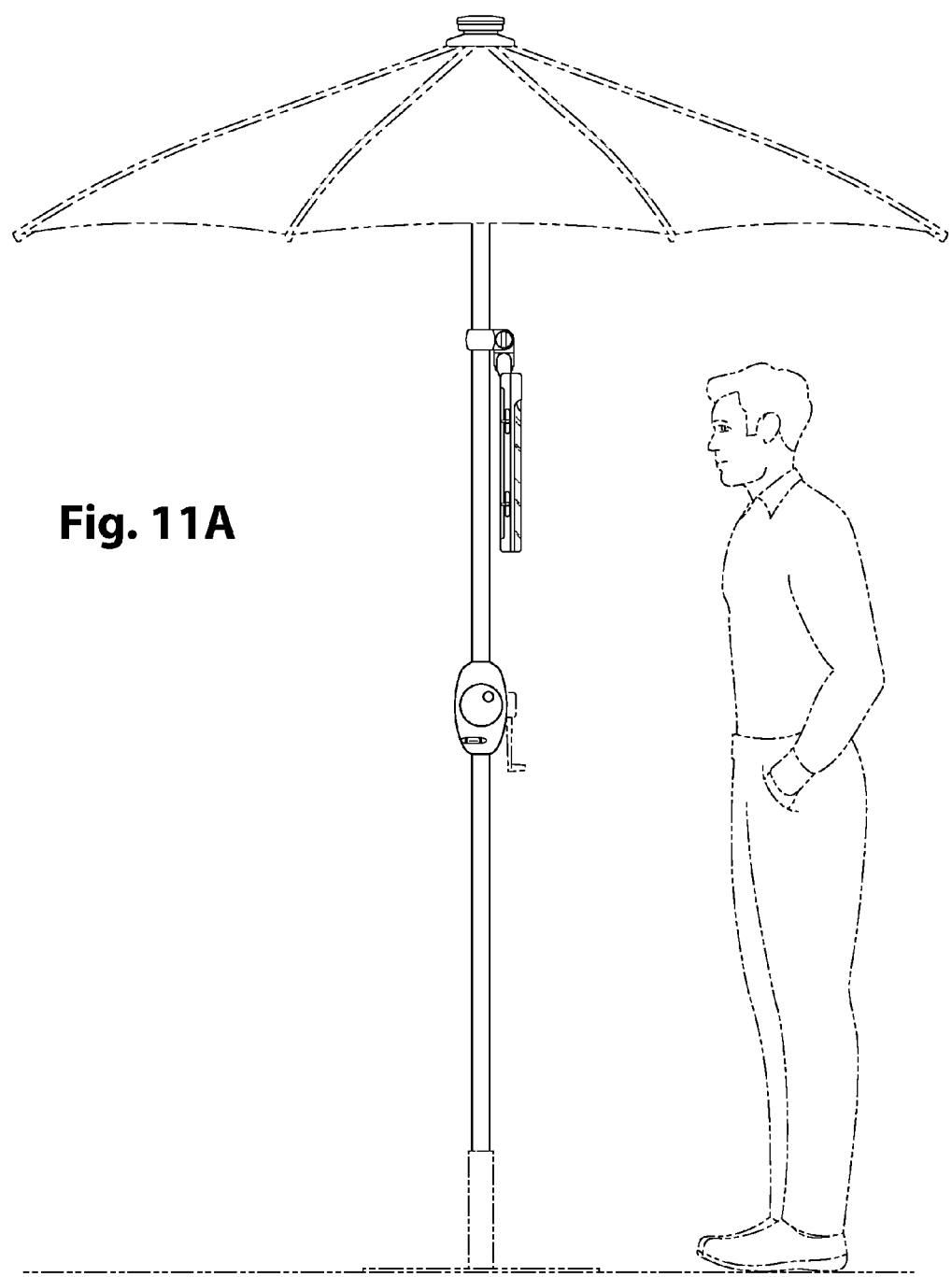

Putting a smart phone, tablet, or laptop in smart-phone tablet laptop waterproof transparent pouch 131 (FIGS. 3B and 3C);
Operating the smart phone, the tablet, or the laptop through the transparent wall of the smart-phone tablet laptop waterproof transparent pouch 131; and
Folding multi-function multi-position rotatable foldable tiltable workstation table 125, in the direction of arrow 134.
How to Use Smart Phone, Tablet, and Laptop on Foldable Tiltable Device-Recharging Workstation System 116
(FIG. 3H)
Placing a smart-phone, tablet, or laptop on foldable Tiltable Device-Recharging Workstation System 116.
How to Retract or Extend Cable 113
(FIGS. 4A, 4B, and 4C)
Inserting a finger in finger-receptacle opening 112; and
Rotating finger-receptacle plate 111 and double-rotational-direction spool 110 in a cable-winding-or-cable-unwinding directions of double-headed arrow 135.
One can extend retractable extendable cable 113 by pulling it out; and
snap it in cable-locking clip 118,
in the direction of arrow 136.
How to Deploy Multiple Sun Visors 129
(FIGS. 5A and 5B)
Folding Multiple sun visors 129,
in the opposite directions of arrows 137*a* and 137*b*.
How to Utilize Foldable Tiltable Cup-Holding System 126
(FIGS. 5A and 5B)
Folding Multiple sun visors 129,
in the opposite directions of arrows 137*a* and 137*b*.
How to Use Foldable Tiltable Device-Recharging Workstation System 116 while Standing Up
(FIG. 6)
Folding foldable tiltable device-recharging workstation system 116,
in the opposite directions of double-headed arrow 138.
How to Use Foldable Tiltable Device-Recharging Workstation System 116 while Laying Down
(FIG. 7)
Folding foldable tiltable device-recharging workstation system 116,
to a desired position,
in the opposite directions of double-headed arrow 139, or
Tilting foldable tiltable device-recharging workstation system 116,
to a desired angle,
in the opposite directions of double-headed arrow 140.
How to Use Foldable Tiltable Device-Recharging Workstation System 116 while Standing or Laying in Swimming Pool
(FIG. 8)
Tilting foldable tiltable device-recharging workstation system 116
to a desired angle,
in the opposite directions of double-headed arrow 141, or
Folding foldable tiltable device-recharging workstation system 116
to a desired position,
in the opposite directions of double-headed arrow 142.
Variation
Each of the components of the unique five-device-in-one solar-powered foldable tiltable device-recharging sun-blocking-visor workstation system can have any shape and size. Each of the components of the unique five-device-in-one solar-powered foldable tiltable device-recharging sun-blocking-visor workstation system can be disposed at any location thereon. The unique five-device-in-one solar-powered foldable tiltable device-recharging sun-blocking-visor workstation system can have at least one of each of its components. For example, the unique five-device-in-one solar-powered foldable tiltable device-recharging sun-blocking-visor workstation system can have more than one snap-in USB-connector such that it can charge more than one device (e.g., smart phone, a tablet, a laptop, etc) at the same time. For example, USB-connector-securing terminal 115 can be disposed on the undersurface of spool housing 109. FIG. 9 illustrates no cup holders in foldable tiltable device-recharging workstation system 116. FIG. 10 illustrate a smaller equivalent variation of foldable tiltable device-recharging workstation system 116. FIGS. 11A and 11B illustrate side views of various positions of the unique five-device-in-one solar-powered foldable tiltable device-recharging sun-blocking-visor workstation system.

MAJOR ADVANTAGES OF THE INVENTION

The present invention substantially departs from the conventional concepts and designs of the prior art. In doing so, the present invention provides a five-device-in-one solar-powered foldable tiltable device-recharging sun-blocking-visor workstation system (having: a) Solar-powered electricity-generating-and-storing-system with extendable-retractable-cable system, b) Foldable tiltable device-recharging workstation system, c) Foldable tiltable sun-visor system, d) Foldable tiltable cup-holding system, and e) Foldable tiltable transparent pouch system), having many unique and significant features, functions, and advantages, which overcome all the disadvantages of the prior art, as follows:
1) It is an object of the new invention to provide a five-device-in-one solar-powered foldable tiltable device-recharging sun-blocking-visor workstation system,
having a foldable tiltable device-recharging workstation system.
Therefore, the five-device-in-one solar-powered foldable tiltable device-recharging sun-blocking-visor workstation system:
a) Can be quickly and easily moved, or re-adjusted up and down on mobile solar-panel umbrella post
to adjust to any respective vertical position needed
(FIGS. 5A, 5B, 5C, 6, 7, and 8);
b) Can quickly and easily be removed, or installed on mobile solar-panel umbrella post,
to allow use without any tools necessary
(FIGS. 5A, 5B, 5C, 6, 7, and 8);
c) Can rotate 360° vertically,
to adjust to any desired position
(FIGS. 5A, 5B, 5C, 6, 7, and 8);
d) Can operate upside down or any degree,
to be utilized inverted or upright on mobile solar-panel umbrella post
(FIGS. 5A, 5B, 5C, 6, 7, and 8);
e) Can rotate 360° around the circumference,
to adjust to any desired position
(FIGS. 5A, 5B, 5C, 6, 7, and 8);
f) Can tilt to any position,
to accommodate a person viewing a mobile device at an upright vertical, a 180° downward position, or any degree in-between
(FIGS. 5A, 5B, 5C, 6, 7, and 8); and
g) Can instantaneously be folded,
to be quickly and conveniently put into storage.

2) It is another object of the new invention to provide a five-device-in-one solar-powered foldable tiltable device-recharging sun-blocking-visor workstation system,
having a foldable tiltable smart-phone tablet laptop waterproof transparent pouch system.
Therefore, the five-device-in-one solar-powered foldable tiltable device-recharging sun-blocking-visor workstation system:
  a) Can conveniently contain a mobile device,
    to store mobile devices while charging
    (FIGS. 3A, 3B, and 3C);
  b) Can additionally be waterproof,
    to protect a mobile device from liquid damage from a nearby swimming pool, rain, or beverages
    (FIGS. 6, 7, and 7);
  c) Can conveniently contain mobile devices while studying,
    to provide a hand-free experience and screen is viewable through the foldable tiltable smart-phone tablet laptop waterproof transparent pouch system
    (FIGS. 6, 7, and 7);
  d) Can conveniently contain mobile device,
    to provide a hand-free experience when multitasking
    (FIGS. 6, 7, and 7);
  e) Can allow user to type on keyboard through flexible pouch material,
    to accomplish tasks on device hands free, while device is suspended
    (FIGS. 6, 7, and 7);
  f) Can contain smart phones, tablets, and other mobile devices of any size,
    to accommodate any user's need
    (FIGS. 6, 7, and 7);
  g) Can conveniently contain mobile device,
    to provide viewing upside down
    (FIGS. 6, 7, and 7);
  h) Can conveniently contain multiple mobile devices,
    to accommodate charging, storage, and viewing more than one mobile device at the same time
    (FIGS. 6, 7, and 7);
  i) Can tilt to any position,
    to accommodate a person viewing a mobile device at an upright vertical view, horizontal view, a downward vertical view, or any degree in-between
    (FIGS. 4A, 4B, 4C, 5A, 5B, 6, 7, 8, 11A, and 11B); and
  j) Can conveniently contain mobile device,
    to provide viewing at any angle
    (FIGS. 4A, 4B, 4C, 5A, 5B, 6, 7, 8, 11A, and 11B).
3) It is still another object of the new invention to provide a five-device-in-one solar-powered foldable tiltable device-recharging sun-blocking-visor workstation system,
having a foldable tiltable sun-visor system.
Therefore, the five-device-in-one solar-powered foldable tiltable device-recharging sun-blocking-visor workstation system:
  a) Can block the sun and protect the skin,
    to help a person view their USB mobile device while charging its battery
    (FIGS. 5A and 5B);
  b) Can fold away easily,
    to quickly and conveniently be put into storage
    (FIGS. 5A and 5B);
  c) Can tilt to any position to block the sun,
    to helping a person with any activity, such as playing cards, or taking a nap by the pool
    (FIGS. 5A and 5B);
  d) Can mount to any vertical position on mobile solar-panel umbrella post,
    to block the sun at any relative height
    (FIGS. 5A and 5B); and
  e) Can operate in conjunction with multi-function multi-position rotatable foldable tiltable workstation table,
    to offer an extremely large shading area, to block the sun's heat
    (FIGS. 5A and 5B).
4) It is a further object of the new invention to provide a five-device-in-one solar-powered foldable tiltable device-recharging sun-blocking-visor workstation system,
having a foldable tiltable cup-holding system.
Therefore, the five-device-in-one solar-powered foldable tiltable device-recharging sun-blocking-visor workstation system:
  a) Can securely hold beverage cups,
    to keep them stable and out of the way of the table
    (FIGS. 5A and 5B);
  b) Can securely hold beverage cups,
    to give space for additional beverages or when the table is in use
    (FIGS. 5A and 5B);
  c) Can instantly be folded,
    to put away for storage, when not needed
    (FIGS. 5A and 5B); and
  d) Can be installed on mobile solar-panel umbrella post
    (FIGS. 5A and 5B).
5) It is an even further object of the new invention to provide a five-device-in-one solar-powered foldable tiltable device-recharging sun-blocking-visor workstation system,
having an extendable-retractable-cable system.
Therefore, the five-device-in-one solar-powered foldable tiltable device-recharging sun-blocking-visor workstation system:
  a) Can perform functions of extending snap-in USB-connector from Spool housing,
    to allow user to charge USB mobile device
    (FIGS. 4A, 4B, and 4C);
  b) Can perform functions of extending snap-in USB-connector from spool housing,
    to operate the said mobile device at a distance from the charging station
    (FIGS. 4A, 4B, and 4C);
  c) Can perform functions of extending snap-in USB-connector from spool housing,
    to operate the device on lap, standing nearby, laying on the ground, or needing to attending a child nearby
    (FIGS. 4A, 4B, and 4C); and
  d) Can allow extended charging capabilities
    to add to the five-device-in-one solar-powered foldable tiltable device-recharging sun-blocking-visor workstation system, when snap-in USB-connector is snapped into a cable-locking clip.
6) It is still another object of the new invention to provide a five-device-in-one solar-powered foldable tiltable device-recharging sun-blocking-visor workstation system,
having a multi-function multi-position rotatable foldable tiltable workstation table.
Therefore, the five-device-in-one solar-powered foldable tiltable device-recharging sun-blocking-visor workstation system:

a) Can quickly and easily be moved, or readjusted up and down on mobile solar-panel umbrella post,
   to adjust to any respective vertical level needed
   (FIGS. 5A, 5B 6, 7, and 8);
b) Can quickly and easily be removed, or installed on mobile solar-panel umbrella post,
   to detach and reattach without any tools required;
c) Can rotate 360° around the circumference of mobile solar-panel umbrella post,
   to be used at desired location
   (FIGS. 5A, 5B 6, 7, and 8);
d) Can operate upside down or any degree,
   to be utilized inverted or upright on mobile solar-panel umbrella post
   (FIGS. 5A, 5B 6, 7, and 8);
e) Can rotate 360° vertically,
   to be used at desired location
   (FIGS. 5A, 5B 6, 7, and 8); and
f) Can expand and fold instantly,
   to put away for self-storage or when collapsing for transport.

7) It is yet another object of the new invention to provide a five-device-in-one solar-powered foldable tiltable device-recharging sun-blocking-visor workstation system, having memory-stick holders.
Therefore, the five-device-in-one solar-powered foldable tiltable device-recharging sun-blocking-visor workstation system:
a) Can conveniently hold and store memory-sticks,
   to provide a hands free experience when multitasking
   (FIGS. 2E and 2F);
b) Can conveniently hold and store memory-sticks,
   to prevent potential liquid spills from contacting memory-sticks
   (FIGS. 2E and 2F);
c) Can conveniently hold and store memory-sticks;
   to temporarily hold memory-sticks while operating another memory-stick in computer device; and
d) Can conveniently hold and store memory-sticks;
   to temporarily hold memory-sticks during transport.

8) It is still yet another object of the new invention to provide a five-device-in-one solar-powered foldable tiltable device-recharging sun-blocking-visor workstation system, having sunglass holders.
Therefore, the five-device-in-one solar-powered foldable tiltable device-recharging sun-blocking-visor workstation system:
a) Can conveniently hold and store multiple sunglasses,
   to provide storage for multiple people
   (FIGS. 2E and 2F);
b) Can securely hold sunglasses,
   to prevent them from being swept away by the wind and damaged
   (FIGS. 2E and 2F);
c) Can provide additional locations to temporarily store sunglasses,
   to participate in other activities
   (FIGS. 2E and 2F); and
d) Can conveniently hold and store sunglasses
   to perform other duties at the multi-function multi-position rotatable foldable tiltable workstation.

What is claimed is:
1. A five-device-in-one solar-powered rotatable foldable tiltable device-charging sun-blocking-visor workstation comprising:

an umbrella post;
at least one solar panel attached to said umbrella post
   for receiving solar energy;
an electricity converter connected to said at least one solar panel
   for converting solar energy to electricity;
a battery connected to said electricity converter
   for storing electricity;
a retractable extendable cable connected to said battery;
at least one connector connected to said retractable extendable cable
   for connecting said retractable extendable cable to at least one mobile device;
a spool for said retractable extendable cable to retractably and extendably be wound thereon,
   said spool having a finger-receptacle opening molded therein for a finger to be inserted therein to rotate said pool to retract and extend said retractable extendable cable;
a 360-degree-and-vertically-adjustable clamp attached to said umbrella post,
   said 360-degree-and-vertically-adjustable clamp having two clamp openings;
a screw
   for being inserted through said two clamp openings;
a wing nut
   for being screwed on said screw;
at least one memory-stick holder molded on said 360-degree-and-vertically-adjustable clamp
   for holding at least one memory stick;
at least one sunglass holder molded on said 360-degree-and-vertically-adjustable clamp
   for holding at least one sunglass;
a rotatable foldable tiltable table rotationally, foldably, and tiltably attached to said 360-degree-and-vertically-adjustable clamp
   for blocking the sun in a plurality of different angles and
   for being used upside down, right side up, and in a plurality of different angles as:
      a rotatable foldable tiltable multi-device-charging platform,
      a rotatable foldable tiltable work-and-entertainment table,
      a rotatable foldable tiltable enlarged sun visor,
      a rotatable foldable tiltable cup-holding tray, and
      a rotatable foldable tiltable device-protecting shield;
at least one opening molded in said rotatable foldable tiltable table
   for holding drinks therein in a plurality of different angles;
a waterproof transparent pouch attached to said rotatable foldable tiltable table
   for holding said at least one mobile device therein in a plurality of different angles such that a user is able to use said at least one mobile device while standing in front of, sitting in front of, swimming in front of, or laying down under said rotatable foldable tiltable table and said at least one mobile device;
a waterproof transparent hood attached to said waterproof transparent pouch
   for keeping water out of said waterproof transparent pouch to protect said at least one mobile device; and
at least one rotatable foldable tiltable sun visor rotationally, foldably, and tiltably hinged on said rotatable foldable tiltable table for blocking the sun in a plurality of different angles such that a user is able to use said at least one mobile device while standing in front of, sitting in front of, swimming in front of, or laying down under said rotatable foldable tiltable table and said at least one mobile device.

2. The five-device-in-one solar-powered rotatable foldable tiltable device-charging sun-blocking-visor workstation of claim 1, wherein said rotatable foldable tiltable table and said waterproof transparent pouch are in an upside-down position such that a user is able to lay down under said rotatable foldable tiltable table and said at least one mobile device while using said rotatable foldable tiltable table and said at least one mobile device.

3. The five-device-in-one solar-powered rotatable foldable tiltable device-charging sun-blocking-visor workstation of claim 2, wherein each of said at least one opening has a round shape.

4. The five-device-in-one solar-powered rotatable foldable tiltable device-charging sun-blocking-visor workstation of claim 1, wherein said rotatable foldable tiltable table and said waterproof transparent pouch are in an upside-down position such that a user is able to swim in front of said rotatable foldable tiltable table and said at least one mobile device while using said rotatable foldable tiltable table and said at least one mobile device.

5. The five-device-in-one solar-powered rotatable foldable tiltable device-charging sun-blocking-visor workstation of claim 1, wherein said rotatable foldable tiltable table and said waterproof transparent pouch are in an upside-down position such that a user is able to stand in front of said rotatable foldable tiltable table and said at least one mobile device while using said rotatable foldable tiltable table and said at least one mobile device.

6. The five-device-in-one solar-powered rotatable foldable tiltable device-charging sun-blocking-visor workstation of claim 1, wherein said rotatable foldable tiltable table and said waterproof transparent pouch are in an upside-down position such that a user is able to sit in front of said rotatable foldable tiltable table and said at least one mobile device while using said rotatable foldable tiltable table and said at least one mobile device.

7. The five-device-in-one solar-powered rotatable foldable tiltable device-charging sun-blocking-visor workstation of claim 1, wherein said waterproof transparent pouch is made of a material such that said material allows said at least one mobile device to be operated through said waterproof transparent pouch by touch.

8. The five-device-in-one solar-powered rotatable foldable tiltable device-charging sun-blocking-visor workstation of claim 1, further comprising a housing for housing said retractable extendable cable, said at least one connector, and said spool.

9. The five-device-in-one solar-powered rotatable foldable tiltable device-charging sun-blocking-visor workstation of claim 1, further comprising a pouch opening punched through said waterproof transparent pouch for said at least one connector to be threaded therethrough.

10. A five-device-in-one solar-charging sun-blocking workstation comprising:
an umbrella post;
at least one solar panel attached to said umbrella post
for receiving solar energy;
an electricity converter connected to said at least one solar panel
for converting solar energy to electricity;
a battery connected to said electricity converter
for storing electricity;
a retractable extendable cable connected to said battery;
at least one connector connected to said retractable extendable cable
for connecting said retractable extendable cable to at least one mobile device;
a spool for said retractable extendable cable to retractably and extendably be wound thereon,
said spool having a finger-receptacle opening molded therein for a finger to be inserted therein to rotate said pool to retract and extend said retractable extendable cable;
an adjustable clamp attached to said umbrella post,
said adjustable clamp having two clamp openings;
a screw
for being inserted through said two clamp openings;
a wing nut
for being screwed on said screw;
a rotatable foldable tiltable table rotationally, foldably, and tiltably attached to said adjustable clamp
for blocking the sun in a plurality of different angles and
for being used upside down, right side up, and in a plurality of different angles as:
a rotatable foldable tiltable multi-device-charging platform,
a rotatable foldable tiltable work-and-entertainment table,
a rotatable foldable tiltable enlarged sun visor,
a rotatable foldable tiltable cup-holding tray, and
a rotatable foldable tiltable device-protecting shield;
at least one opening molded in said rotatable foldable tiltable table
for holding drinks therein in a plurality of different angles;
a waterproof transparent pouch attached to said rotatable foldable tiltable table
for holding said at least one mobile device therein in a plurality of different angles such that a user is able to use said at least one mobile device while standing in front of, sitting in front of, swimming in front of, or laying down under said rotatable foldable tiltable table and said at least one mobile device;
a waterproof transparent hood attached to said waterproof transparent pouch
for keeping water out of said waterproof transparent pouch to protect said at least one mobile device; and
at least one rotatable foldable tiltable sun visor rotationally, foldably, and tiltably hinged on said rotatable foldable tiltable table
for blocking the sun in a plurality of different angles such that a user is able to use said at least one mobile device while standing in front of, sitting in front of, swimming in front of, or laying down under said rotatable foldable tiltable table and said at least one mobile device.

11. The five-device-in-one solar-charging sun-blocking workstation of claim 10, wherein said rotatable foldable tiltable table and said waterproof transparent pouch are in an upside-down position such that a user is able to lay down under said rotatable foldable tiltable table and said at least one mobile device while using said rotatable foldable tiltable table and said at least one mobile device.

12. The five-device-in-one solar-charging sun-blocking workstation of claim 11, further a drinking glass is provided and inserted into said at least one opening, wherein said drinking glass, said rotatable foldable tiltable table, and said waterproof transparent pouch are in angled positions.

13. The five-device-in-one solar-charging sun-blocking workstation of claim 10, wherein said rotatable foldable tiltable table and said waterproof transparent pouch are in an upside-down position such that a user is able to swim in front of said rotatable foldable tiltable table and said at least one mobile device while using said rotatable foldable tiltable table and said at least one mobile device.

14. The five-device-in-one solar-charging sun-blocking workstation of claim 10, wherein said rotatable foldable tiltable table and said waterproof transparent pouch are in an upside-down position such that a user is able to sit in front of said rotatable foldable tiltable table and said at least one mobile device while using said rotatable foldable tiltable table and said at least one mobile device.

15. The five-device-in-one solar-charging sun-blocking workstation of claim 10, wherein said rotatable foldable tiltable table and said waterproof transparent pouch are in an upside-down position such that a user is able to stand in front of said rotatable foldable tiltable table and said at least one mobile device while using said rotatable foldable tiltable table and said at least one mobile device.

16. The five-device-in-one solar-charging sun-blocking workstation of claim 10, wherein said waterproof transparent pouch is made of a material such that said material allows said at least one mobile device to be operated through said waterproof transparent pouch by touch.

17. The five-device-in-one solar-charging sun-blocking workstation of claim 10, further comprising a housing for housing said retractable extendable cable, said at least one connector, and said spool.

18. The five-device-in-one solar-charging sun-blocking workstation of claim 10, further comprising a pouch opening punched through said waterproof transparent pouch for said at least one connector to be threaded therethrough.

19. A solar-charging station comprising:
an umbrella post;
at least one solar panel attached to said umbrella post
for receiving solar energy;
an electricity converter connected to said at least one solar panel
for converting solar energy to electricity;
a battery connected to said electricity converter
for storing electricity;
a cable connected to said battery;
at least one connector connected to said cable
for connecting said cable to at least one mobile device;
a spool for said cable to retractably and extendably be wound thereon;
a clamp adjustably attached to said umbrella post;
a table rotationally, foldably, and tiltably attached to said clamp
for blocking the sun in a plurality of different angles and
for being used upside down, right side up, and in a plurality of different angles as:
a rotatable foldable tiltable multi-device-charging platform,
a rotatable foldable tiltable work-and-entertainment table,
a rotatable foldable tiltable enlarged sun visor,
a rotatable foldable tiltable cup-holding tray, and
a rotatable foldable tiltable device-protecting shield;
at least one opening molded in said table
for holding drinks therein;
a transparent pouch attached to said table
for holding said at least one mobile device therein in a plurality of different angles such that a user is able to use said at least one mobile device while standing in front of, sitting in front of, swimming in front of, or laying down under said table and said at least one mobile device; and
at least one sun visor rotationally, foldably, and tiltably hinged on said table
for blocking the sun in a plurality of different angles
such that a user is able to use said at least one mobile device while standing in front of, sitting in front of, swimming in front of, or laying down under said table and said at least one mobile device.

20. The solar-charging station of claim 19, wherein said transparent pouch is made of a material such that said material allows said at least one mobile device to be operated through said transparent pouch by touch.

\* \* \* \* \*